United States Patent
Paz et al.

(10) Patent No.: US 7,360,230 B1
(45) Date of Patent: Apr. 15, 2008

(54) OVERLAY MANAGEMENT

(75) Inventors: Ofir Paz, Rishon Leziyon (IL); Avishai Keren, Rosh Ha'avin (IL); Meir Feder, Herzelia (IL); Maier Fenster, Petach Tikva (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/744,771

(22) PCT Filed: Jul. 27, 1999

(86) PCT No.: PCT/IL99/00412
§ 371 (c)(1),
(2), (4) Date: Apr. 27, 2001

(87) PCT Pub. No.: WO00/07372
PCT Pub. Date: Feb. 10, 2000

Related U.S. Application Data

(63) Continuation-in-part of application No. PCT/IL98/00349, filed on Jul. 27, 1998.

(51) Int. Cl.
*G06F 3/00* (2006.01)
(52) U.S. Cl. .................... 725/47; 725/54; 725/126; 382/243
(58) Field of Classification Search ............ 725/34, 725/39–56, 54; 382/239–243; 345/660–661; 345/641; 715/789, 716; 375/240.22, 240.08, 375/240.1, 240.09
See application file for complete search history.

(56) References Cited

U.S. PATENT DOCUMENTS

| | | | |
|---|---|---|---|
| 4,729,020 A | 3/1988 | Schaphorst et al. | 375/340.05 |
| 4,963,030 A * | 10/1990 | Makur | 375/240.22 |
| 5,115,309 A | 5/1992 | Hang | 358/133 |
| 5,229,862 A | 7/1993 | Takahashi et al. | 386/109 |
| 5,319,455 A | 6/1994 | Hoarty et al. | 348/7 |
| 5,422,674 A * | 6/1995 | Hooper et al. | 375/240.15 |
| 5,493,638 A | 2/1996 | Hooper et al. | 395/135 |
| 5,564,001 A | 10/1996 | Lewis | 395/154 |
| 5,583,995 A | 12/1996 | Gardner et al. | 709/219 |
| 5,605,195 A | 2/1997 | Eslinger et al. | 705/1 |
| 5,612,742 A | 3/1997 | Krause et al. | 348/385 |
| 5,617,333 A | 4/1997 | Oyamada et al. | 709/247 |
| 5,619,591 A | 4/1997 | Tsang et al. | 382/166 |
| 5,623,587 A | 4/1997 | Bulman | 345/630 |
| 5,687,257 A | 11/1997 | Paik et al. | 382/239 |
| 5,724,091 A | 3/1998 | Freeman et al. | 348/13 |

(Continued)

FOREIGN PATENT DOCUMENTS

WO    PCT/WO97/12486    4/1997

(Continued)

OTHER PUBLICATIONS

U.S. Appl. No. 09/770,769, filed Jan. 25, 2001, Ofir Paz, et al.

(Continued)

*Primary Examiner*—Christopher Grant
*Assistant Examiner*—Chris Parry

(57) ABSTRACT

A method of personalizing a broadcast channel, comprising: receiving an input from a user (110); and personalizing the broadcast channel; and transmitting the personalized broadcast channel to the user using a compressed video transport method. Preferably, computer generated information is overlaid on the channel to achieve the personalization.

42 Claims, 5 Drawing Sheets

U.S. PATENT DOCUMENTS

| | | | | |
|---|---|---|---|---|
| 5,734,853 | A | 3/1998 | Hendricks et al. | 395/352 |
| 5,761,606 | A | 6/1998 | Wolzien | 455/6.2 |
| 5,778,098 | A * | 7/1998 | Lee et al. | 382/236 |
| 5,801,779 | A | 9/1998 | Uz et al. | 375/240.24 |
| 5,815,146 | A | 9/1998 | Youden et al. | 345/720 |
| 5,819,004 | A | 10/1998 | Azadegan et al. | 386/112 |
| 5,828,370 | A | 10/1998 | Moeller et al. | 345/720 |
| 5,835,843 | A | 11/1998 | Haddad | 455/4.2 |
| 5,838,927 | A | 11/1998 | Gillon et al. | 395/200.77 |
| 5,892,535 | A | 4/1999 | Allen et al. | 348/9 |
| 5,903,673 | A * | 5/1999 | Wang et al. | 382/236 |
| 5,926,569 | A | 7/1999 | Nickerson | 382/232 |
| 5,961,603 | A | 10/1999 | Kunkel et al. | 709/229 |
| 5,982,445 | A | 11/1999 | Eyer et al. | 348/461 |
| 5,990,976 | A | 11/1999 | Higashida | 648/588 |
| 6,003,030 | A | 12/1999 | Kenner et al. | 707/10 |
| 6,005,620 | A | 12/1999 | Yang et al. | 348/385 |
| 6,006,241 | A | 12/1999 | Purnaveja et al. | 715/512 |
| 6,011,590 | A | 1/2000 | Saukkonen | 375/240.05 |
| 6,014,693 | A | 1/2000 | Ito et al. | 709/219 |
| 6,021,198 | A | 2/2000 | Anigbogu et al. | 380/269 |
| 6,021,433 | A | 2/2000 | Payne et al. | 709/219 |
| 6,037,988 | A * | 3/2000 | Gu et al. | 375/240.16 |
| 6,044,396 | A | 3/2000 | Adams | 725/95 |
| 6,049,316 | A | 4/2000 | Nolan et al. | 345/698 |
| 6,049,831 | A | 4/2000 | Gardell et al. | 709/236 |
| 6,108,727 | A | 8/2000 | Boals et al. | 710/68 |
| 6,151,636 | A | 11/2000 | Schuster et al. | 709/247 |
| 6,154,771 | A * | 11/2000 | Rangan et al. | 709/217 |
| 6,175,650 | B1 | 1/2001 | Sindhu et al. | 382/171 |
| 6,175,663 | B1 | 1/2001 | Huang | 382/284 |
| 6,202,211 | B1 | 3/2001 | Williams, Jr. | 725/78 |
| 6,205,485 | B1 | 3/2001 | Kikinis | 709/231 |
| 6,208,354 | B1 * | 3/2001 | Porter | 345/634 |
| 6,215,904 | B1 | 4/2001 | Lavallee | 382/234 |
| 6,226,642 | B1 | 5/2001 | Beranek et al. | 707/10 |
| 6,243,388 | B1 | 6/2001 | Mussman et al. | 370/420 |
| 6,292,834 | B1 | 9/2001 | Ravi et al. | 709/233 |
| 6,295,380 | B1 | 9/2001 | Takahashi | 382/240 |
| 6,311,197 | B2 | 10/2001 | Mighdoll et al. | 707/513 |
| 6,356,664 | B1 * | 3/2002 | Dunn et al. | 382/239 |
| 6,381,748 | B1 | 4/2002 | Lin et al. | 725/109 |
| 6,389,072 | B1 | 5/2002 | Tzou et al. | 375/240 |
| 6,397,387 | B1 | 5/2002 | Rosin et al. | 725/44 |
| 6,507,672 | B1 | 1/2003 | Watkins et al. | 382/232 |
| 6,507,872 | B1 | 1/2003 | Geshwind | 709/236 |
| 6,606,746 | B1 * | 8/2003 | Zdepski et al. | 725/37 |
| 6,622,306 | B1 | 9/2003 | Kamada | 725/109 |
| 6,646,677 | B2 | 11/2003 | Noro et al. | 348/156 |
| 6,675,386 | B1 | 1/2004 | Hendricks et al. | 725/105 |
| 6,721,455 | B1 | 4/2004 | Gourdol | 382/232 |
| 6,754,905 | B2 * | 6/2004 | Gordon et al. | 725/38 |

FOREIGN PATENT DOCUMENTS

| | | |
|---|---|---|
| WO | WO 97/12486 | 4/1997 |
| WO | PCT/IL98/00349 | 7/1998 |
| WO | PCT/IL99/00412 | 7/1999 |
| WO | PCT/IL99/00413 | 7/1999 |

OTHER PUBLICATIONS

U.S. Appl. No. 09/770,644, filed Jan. 25, 2001, Ofir Paz, et al.
U.S. Appl. No. 09/770,767, filed Jan. 25, 2001, Meir Feder, et al.
U.S. Appl. No. 09/770,765, filed Jan. 25, 2001, Meir Feder, et al.
U.S. Appl. No. 09/770,766, filed Jan. 25, 2001, Ofir Paz, et al.
U.S. Appl. No. 10/975,693, filed Oct. 27, 2004, Ofir Paz, et al.
U.S. Appl. No. 10/976,063, filed Oct. 27, 2004, Ofir Paz, et al.
U.S. Appl. No. 09/744,662, filed Jan. 25, 2001, Ofir Paz, et al.
Tristan Richardson, et al., *Virtual Network Computing*, IEEE Internet Computing, Jan.-Feb. 1998, pp. 33-38.

* cited by examiner

OVERLAY MANAGEMENT

RELATED APPLICATIONS

This application is a continuation-in-part of PCT application PCT/IL98/00349, filed Jul. 27, 1998 and designating the US, the disclosure of which is incorporated by reference. This application also incorporates herein by reference a PCT application titled "Selective Compression", filed in the PCT via the Israel receiving office on even date.

FIELD OF THE INVENTION

The present invention relates to remote operation of computer systems and in particular to remote access to a computer running an Internet browser.

BACKGROUND OF THE INVENTION

Various methods of remotely accessing a computing server have been used in the past. One of the first methods utilized a server and terminals. Input is entered at the terminals, transmitted to the server and the results are send back over data lines to the terminals. The terminals can be "dumb" terminals, such as a VT52, with no processing power except to display the data, or they can be smart terminals, such as an IBM 3270, which can do some basic form filling without requiring intervention of the server.

As computing power has grown cheaper, various other strategies have been used. In the X11 graphical networking protocol, a display server sends bitmaps to a display client and receives input events from the client. In the NeWS graphical networking protocol, a server sends short code segments to a client computer the code segments perform display and input handling functions at the client and, when needed, send input to- and receive display data from- the server.

A somewhat different type of remote computer access is Internet-TV. A television set is upgraded using an electronic box so that the television may be used to access the Internet. In one system, Internet related data is transmitted to and from the electronic box using protocols which transmit data over a cable network. In some instances, the data is transmitted using a data channel provided by an MPEG compression protocol. In one system, the box is a computer, which performs the Internet communication via the cable network and which uses the television as a display. In another system, a server at a cable center, sends graphical display commands to the box and the box generates a video signal responsive to the commands. Typically, the display commands are a subset of Java or HTML. In another system, the data comprises Java scripts which are executed by the box.

Cable networks have also long been used to send video and/or audio programs on demand to a particular subscriber. The video programs are compressed before sending so that a wider bandwidth is available over the cable networks. A set-top box at each subscriber is hardwired (and/or programmed) to decompress the video program and convert it into a video signal for the television. Such video on demand may be a live performance or may be retrieved from an archive. It is also possible to view video segments via the Internet.

Generally, when video is transmitted, a same band width is allocated to a plurality of video channels. In packet based video transmission, subscribers and/or channels that require a higher data rate receive more packets per second than subscribers who need a lower data rate. A company named "iMedia" uses a method of statistical multiplexing in which bandwidth is dynamically allocated between video channels, based on signal characteristics of the video being transmitted. The allocation does not depend on the content per-se of the video channels. In fact, the statistical multiplexing is preferably affected without decompressing the images.

Related patent publications include U.S. Pat. Nos. 5,612,742, 5,687,257 and 5,115,309 and PCT publication WO 97/12486, the disclosure of which are incorporated herein by reference.

The following articles, "Polygon Assisted JPEG and MPEG Compression of Synthetic Images", by Marc Levoy, Proceeding of Siggraph 1995, "Model Based Motion Estimation for Synthetic Animations", by Maneesh Agrawala, Andrew C. Beers and Navin Chaddha, in ACM *Multimedia 1995*, and "Compression Performance of the Xremote Protocol", by John Danskin and Pat Hanrahan, *Proceedings 1994 Data Compression Conference*, the disclosures of which are incorporated herein by reference, describe methods compressing animation into MPEG format, on a single machine. In these methods the compression is faster since the "video source", the animation, is completely known.

SUMMARY OF THE INVENTION

One object of some embodiments of the present invention is to provide a client-server protocol which operates via a cable network. Preferable, the server is used to connect to the Internet. Preferably, the client comprises a television and a set-top box.

An object of some preferred embodiments of the invention is to provide methods of more efficiently compressing video, which video is generated by a computer.

An object of some preferred embodiments of the invention is to provide methods of bandwidth allocation for cable-network systems where the data transmitted relates to computer communications. Preferably, the computer communications comprise compressed screen displays.

One aspect of some preferred embodiments of the present invention relates to providing remote computer access using compressed video. Preferably, one or more clients are connected to a single server using a cable network. Preferably, displays are sent from the server to the clients using compressed video, preferably using an MPEG II compression protocol. Preferably, the clients provide feedback to the server using data transmission over the cable network. Alternatively, the feedback may be provided over a telephone line.

Another aspect of some preferred embodiments of the invention relates to efficient video compression, especially MPEG II compression, of computer generated displays. Efficient compression may be faster, of a higher quality and/or be obtained using a cheaper hardware and/or software base. In one preferred embodiment of the invention, such efficient compression is achieved by bypassing motion estimation algorithms. Such bypassing may be achieved by taking note of display manipulation commands and tracking which portions of a display are changed and which are shifted. Display manipulation commands include, for example, scrolling commands and pan commands.

Alternatively or additionally, efficient compression is achieved by maintaining the compression of video, audio and/or still images which are retrieved by the server and sent to the client, instead of decompressing them and then compressing them again prior to sending them.

Alternatively or additionally, efficient compression is achieved by modifying a display, which would have been used for a user working on the server, so that it can be more efficiently compressed.

Alternatively or additionally, efficient compression is achieved by direct drawing of graphical elements of a display into a DCT space, instead of- or in addition to- drawing into an image space and then performing a transform.

Alternatively or additionally, efficient compression is achieved by reusing portions of a display and/or a DCT space, between images and/or between clients.

Another aspect of some preferred embodiments of the invention relates to image processing an image and/or a video stream. In a preferred embodiment of the invention, image processing of an image is combined with a compression stage by providing an image, compressing the image and image processing the image by manipulation of compression parameters and/or by processing of the compressed data. It should be appreciated that it would have been possible to process the image before compressing. However, in some cases, the image processing is more computational efficient by processing the compressed data. In a preferred embodiment of the invention, an image is low-pass filtered by reducing the quantization rate of low frequency components. In a preferred embodiment of the invention, only the vertical frequency components are modified, to reduce flicker in a reconstructed image. In another example a different wavelet resolution is used in a vertical direction of an image.

Another aspect of some preferred embodiments of the invention relates to asynchronic image compression and transmission. In a preferred embodiment of the invention, an image or an image portion is compressed in an asynchronic manner, for example, depending on available bandwidth, available computational power, indication of changes in the image, desirable image quality and/or type of change in the image. In a preferred embodiment of the invention, the display rate and/or the image generate rate are unaffected by the asynchronic characteristics of the data compression.

In a preferred embodiment of the invention, a compression step is prompted by an event which marks a change in the image. In a preferred embodiment of the invention, only the portions of the image which are affected by the event are compressed. A new image frame is created and sent to a decompression and display unit. Such a new image frame may comprise a completely new frame or a frame which defines changes over one or more previous frames. In a preferred embodiment of the invention, two change events may be combined in a single new frame. In some cases, one change event may moot a previous change event, so that only the changes associate with one event are processed.

In a preferred embodiment of the invention, the system may operate at several different frame rates simultaneously: image generation frame rate, actual compression frame rate, maximum compression frame rate and display frame rate. In a preferred embodiment of the invention, each of these frame rates may be independently varied, for example, the image generation rate may depend on a computer program which generates the image. The actual compression rate may depend on available computing power and/or on whether there were any changes in the frame. The maximum compression rate may be the maximum frame rate which is allocated for a particular user and may depend on a user request, available bandwidth and/or payment schedule. The display rate may depend on the characteristics of the display device, be it NTSC, PAL or HDTV. In a preferred embodiment of the invention, the actual compression rate and the display rate are synchronized by buffering the actually sent frames with "no change" frames, to maintain the display frame rate constant. In a preferred embodiment of the invention, the maximum frame rate determines the number of frames sent, with the balance between the maximum frame rate and the compression frame rate also being buffered using "no change" frames.

Alternatively or additionally, the MPEG decompression module may be modified to work with variable frame rates.

Another aspect of some preferred embodiments of the invention relates to bandwidth allocation between a plurality of clients. In accordance with one preferred embodiment of the invention, the compression depth is traded-off between the clients. Preferably, each client is provided with a minimum bandwidth according to his needs.

Alternatively or additionally, bandwidth is allocated by providing each client with a different frame rate. Typically, a 25/30 HZ (changed) frame rate is not needed in any computer application, so that a lower frame rate may generally be used for such applications.

Alternatively or additionally the bandwidth is allocated responsive to the amount of motion in the display for each client.

Another aspect of some preferred embodiments of the invention relates to adjusting the displayed information to match a particular compression required and/or display characteristics of a television used to display the data. In one example, a cursor flashing rate may be changed so that a lower frame rate is required. In another example, the colors of a displayed portion are adjusted so that compression of color components is more efficient. In still another example, display elements, such as bullets and letters are moved so that they do not straddle compression-block boundaries. In another example, a display background may be replaced by a different display background, for example to simplify compression or to utilize a pre-compressed background. Preferably, the background is compared to a set of stored background portions to determine which background is most similar. In a preferred embodiment of the invention, if all the pre-stored backgrounds are different by more than a threshold amount, the original background may be used. Alternatively or additionally, the original background may be modified to simplify compression. In a preferred embodiment of the invention, a background is analyzed to determine if it is unique and should not be replaced. Such an analysis may include, inter alia, analyzing the size of the background image, analyzing the contrast and/or analyzing the colors of the image. Generally, a garish, large and/or high-contrast background is a unique background. Plain, simple and low-contrast backgrounds are generally "standard" and replaceable backgrounds. Preferably, when determining which background to replace the original background with, a plurality of parameters of the original background are used to select a match. Such parameters can include main color (a replacement background can be set to that color), spatial frequency spectrum (a background with a similar spectrum can be selected) and size (a background with a similar size and/or aspect ration may be selected). Alternatively or additionally, other display elements, such as icons, buttons, menus and fonts may also be replaced and/or modified in similar ways to a background.

Another aspect of some preferred embodiments of the invention relates to generating a plurality of content-unrelated compressed video streams from a single computer. In some preferred embodiments of the invention, such a single computer may include a plurality of processing units, sharing resources, such as memory and/or a main data bus. In a preferred embodiment of the invention, when a resource is not needed for the generation of one channel, that resource may be used by a second channel. In a preferred embodiment of the invention, at least some of the processing associated with the generation of both channels is performed on a single CPU. Preferably, a single computer generates displays for 4, 10 or even 20 channels, i.e., clients.

Another aspect of some preferred embodiments of the invention relates to a virtual device driver for an operating system, so that a plurality of full size windows may be displayed simultaneously on the virtual device, by a host computer. Preferably, each one of the full-size displays is converted into a separate and content-unrelated video stream. In a preferred embodiment of the invention, each window runs an instance of an Internet browser. In a preferred embodiment of the invention, the border and/or other portions of the browser are not shown. Alternatively or additionally, a control area may be optionally provided by server 16. Preferably, such a control area is overlaid on the display.

Another aspect of some preferred embodiments of the invention relates to broadcasting compressed video data packets representing a plurality of display channels, where some packets may be used for more than one channel. In one example, a packet including data corresponding to a menu portion of a web browser is utilized and decompressed by all the viewers which view that particular browser. In another example, when a plurality of viewers view a same TV or WWW channel, a temporal and/or spatial advertisement portion of the channel may be personalized for a particular viewer or for a group of users. The decompression unit at each different user or group or users preferably accepts different packets and thus may show different advertisements, on the same channel.

Another aspect of some preferred embodiments of the invention relates to treating WWW sites, radio stations, video on demand, cable channels and TV channels as different instances of multi-media presentation channels. In a preferred embodiment of the invention, some WWW sites, such as CNN, Microsoft and the local weather are set up as permanent channels. In some preferred embodiments of the invention the interactivity of a channel may be reduced in order to allow more channels in a given bandwidth.

In a preferred embodiment of the invention, such channels may be switched between and viewed on a single display device, such as a TV or a computer display. Alternatively or additionally, links may be defined between portions of such channels and portions of other such channels. Preferably, a user may follow such links to switch between channels. Alternatively or additionally, a user may view a plurality of such channels simultaneously and/or in an overlay. In a preferred embodiment of the invention, linking from a TV channel is enabled by an overlay which indicates which portions of the channel include links and/or where such links point. In a preferred embodiment of the invention, such links may be dynamic and/or track portions of the image. An audio channel or a TV channel may include an associated visual display of links and/or may include voice annotations informing of links. In a preferred embodiment of the invention, a link may be selected by a voice command. In a preferred embodiment of the invention, the links are personalized to match a particular viewer.

In a preferred embodiment of the invention, a web site may be used to browse TV channels. When a particular link on the web site is followed, a corresponding TV channel may be displayed. In a preferred embodiment of the invention, a cable operator may provide a WWW interface to browsing a TV channel catalog and especially a video-on-demand catalog.

In a preferred embodiment of the invention, advertisements in the multimedia channels are treated in aggregate. Thus, advertisements may be personalized for a particular viewer, depending on the user, for all the different types of multimedia channel. Generation of advertisements, tracking of user viewing and selection of advertisements shown may be effected using a single system, albeit possibly with different accounting for the different types of channels.

An aspect of some preferred embodiments of the invention relates to generating and disseminating an enhanced display based on a broadcast stream. In a preferred embodiment of the invention, a broadcast video stream, such as a TV channel, is enhanced by adding an overlay or by showing it side by side with other information, such as provided from a cable head end. Other possible types of enhancements include image processing and adding stereo effects. In a preferred embodiment of the invention, this information is personalized for a particular viewer. Preferably, the quality of the TV channel is reduced for this display, for example by reducing spatial resolution thereof or by using an increased compression ratio. Thus, a plurality of personalized enhanced stations can be provided using a limited bandwidth. Possibly, the quality reduction is done once per TV channel and then the reduced quality channel is used for a plurality of personalized enhancements. Alternatively or additionally, an audio stream associated with the channel is not modified and is broadcast to all the users of the enhanced channel. Alternatively to enhancing video, also audio channels may be enhanced.

There is thus provided in accordance with a preferred embodiment of the invention, a method of personalizing a broadcast channel, comprising:

receiving an input from a user;

personalizing the broadcast channel; and transmitting the personalized broadcast channel to the user using a compressed video transport method. Preferably, said transmitting comprises transmitting in a broadcast system, whereby the personalized transmitted channel reaches a plurality of subscribers. Preferably, only a designated user can view said personalized channel.

In a preferred embodiment of the invention, said input comprises a response to a personalized channel. Alternatively or additionally, personalizing comprises overlaying information. Preferably, said information comprises information form an Internet. Alternatively or additionally, said information is provided as a set of display commands.

In a preferred embodiment of the invention, said personalization makes said channel interactive. Alternatively or additionally, an identification for which to perform said personalization is determined by said user input. Preferably, said user input comprises a user login id.

There is also provided in accordance with a preferred embodiment of the invention, a method of transmitting a personalized channel, comprising:

providing a compressed video broadcast channel;

personalizing said channel; and transmitting said personalized channel to a user, over a broadcast system, using a compressed video transport. Preferably, said channel is transmitted using a single channel of said transport.

There is also provided in accordance with a preferred embodiment of the invention, a method of transmitting a personalized channel, comprising:

providing a compressed video broadcast channel;

personalizing said channel; and transmitting said personalized channel to a user, using a single channel of a compressed video transport.

In a preferred embodiment of the invention, said personalizing comprises modifying the video. Alternatively or additionally, said personalizing comprises modifying a data section of said transport, for application by a set-top box at said user. Preferably, modifying said data section comprises adding display commands for said set-top box to said data section. Alternatively or additionally, modifying said data section comprises adding a compressed overlay for said set-top box to overlay, to said data section. Preferably, said overlay is compressed using a vector quantization method. Alternatively or additionally, said overlay is compressed using a chain code compression method. Alternatively or additionally, said compression does not transmit data corresponding to overlay blocks which do not change between frames.

In a preferred embodiment of the invention, modifying said data section comprises adding replacement image blocks for said set-top box to use for replacing blocks of said channel, to said data section.

In a preferred embodiment of the invention, said personalization comprises adding an output from a computer program. Preferably, said computer program comprises an e-mail program. Alternatively or additionally, said computer program comprises an Internet browser.

In a preferred embodiment of the invention, personalizing said channel comprises not modifying an audio section of the cannel, such that said audio can used by a plurality of different personalized channels.

Alternatively, personalizing said channel comprises modifying an audio section of the cannel. Preferably, said modifying comprises adding feedback for user interactions to said audio. Alternatively or additionally, said modifying comprises modifying only a single channel of two channels of said audio. Alternatively or additionally, said modifying comprises enhancing said audio.

In a preferred embodiment of the invention, personalizing said channel comprises enhancing a video display of said channel. Alternatively or additionally, personalizing said channel comprises showing data side by side with a reduced version of said channel. Alternatively or additionally, personalizing said channel comprises overlaying data on said channel. Preferably, said data is shown as a ticker.

In a preferred embodiment of the invention, personalizing said channel comprises:

providing a list of display commands; and modifying the channel using the list of display commands. Preferably, said modifying the channel comprises:

generating a compressed video stream from said commands; and combining said compressed video stream and said channel. Preferably, said generating comprises directly generating transform coefficients from said commands.

In a preferred embodiment of the invention, said broadcast channel is a compressed broadcast channel. Preferably, said channel is compressed using an MPEG compliant compression scheme. Preferably, said MPEG comprises MPEG II.

In a preferred embodiment of the invention, said compressed video transport comprises an MPEG compliant transport. Preferably, said MPEG comprises MPEG II.

BRIEF DESCRIPTION OF FIGURES

The invention will be more clearly understood by reference to the following description of preferred embodiments thereof in conjunction with the figures, wherein identical structures, elements or parts which appear in more than one figure are labeled with the same numeral in all the figures in which they appear, in which.

DETAILED DESCRIPTION OF THE PREFERRED EMBODIMENTS

Figure 1:
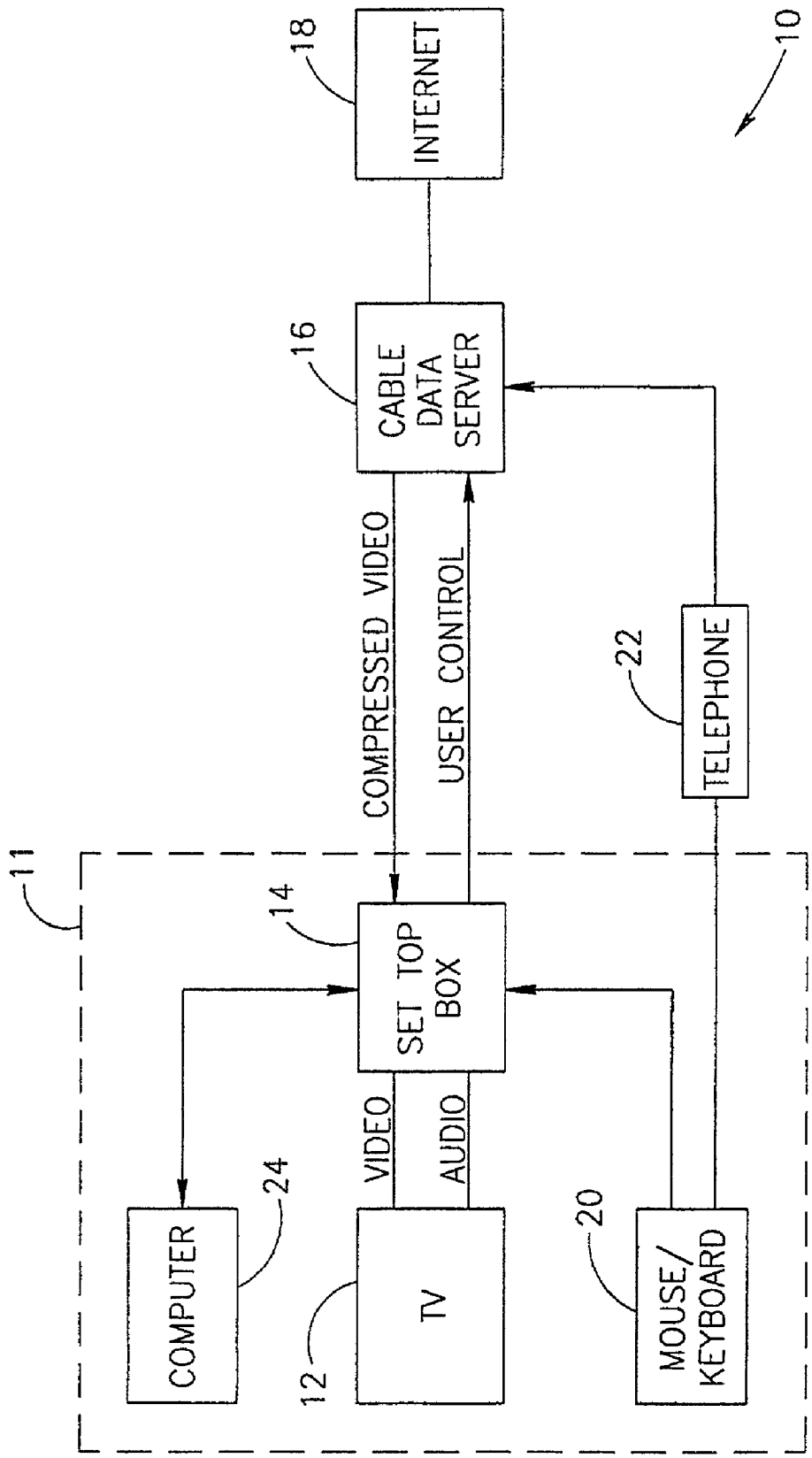
FIG. 1 schematically illustrates a client/server configuration, in accordance with a preferred embodiment of the invention.

FIG. 1 schematically illustrates a client/server configuration 10, in accordance with a preferred embodiment of the invention. A server 16 communicates with a client 11, using a compressed video signal. Typically, a single server 16 is connected to and services a large number of clients 11. Client 11 comprises a video display, preferably a television set 12 (TV). The compressed video signal is preferably received by a set-top box 14 which decompresses the compressed signal and sends a video signal to TV 12. In a preferred embodiment of the invention, set-top box 14 is also used for viewing cable channels and/or pay-per-view programs.

In a preferred embodiment of the invention, client 11 includes input devices 20, preferably a mouse and/or a key-board. Alternatively, a remote-control with a small number of buttons is used for input. Input devices 20 may be connected to server 16 via a cable uplink connection, such as through set-top box 14. Such connections are well known in the art and may be used for transmitting small amounts of information back to a cable server. One such connection is defined by Liberate Inc., and provided by Scientific Atlanta Inc. (SA). Alternatively or additionally, the connection may be via a telephone connection 22. In a preferred embodiment of the invention, user information, such as images and e-mail letters are faxed to server 16.

In a preferred embodiment of the invention, input devices 20 are wireless, such as infrared or ultrasonic, and set-top box 14 or telephone connection 22 include a suitable detector.

In some preferred embodiments of the invention, client 11 may comprise a computer 24 which can perform both the decompression and the display. Alternatively or additionally, the compressed video stream is used to carry data, preferably on a data channel of the compression protocol, to computer 24, from server 16. Such data communications may additionally or alternatively lead from computer 24 directly to server 16. Alternatively or additionally, input devices of computer 24, such as a mouse, may be used as an input device 20.

In one preferred embodiment of the invention, a direct computer/server connection is used to upload files to server 16 for transmission elsewhere and/or for downloading data files from the Internet.

In a preferred embodiment of the invention, server 16 is connected to an Internet 18 and client 11 is used to browse the Internet. Alternatively, server 16 may run other programs, such as a word processor, a spread-sheet or a computer game. In a preferred embodiment of the invention, the program executed by server 16 is a program which manages a subscriber's interaction with the cable company. In another preferred embodiment of the invention, the program is an e-mail program.

In one preferred embodiment of the invention, a program executed on server 16 may be used to browse data stored at server 16, for example DVD multimedia. In a preferred embodiment of the invention, server 16 maintains a copy of information which is often downloaded from the Internet, so that it can be simply and quickly browsed. Such information preferably includes, games, images, on-line journals and/or and data which is often downloaded and/or downloaded by more than a certain number of users.

Figure 2:
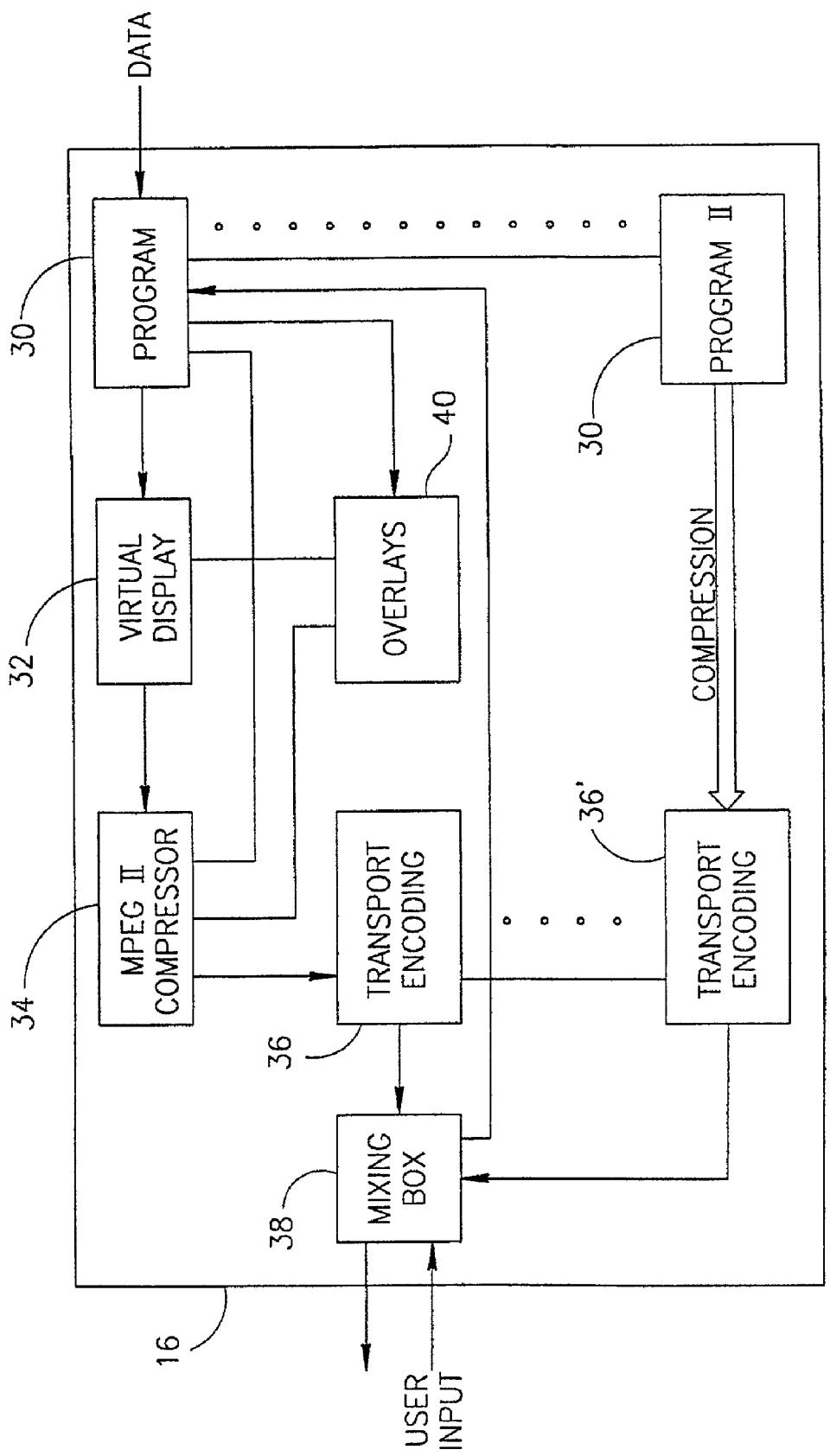
FIG. 2 schematically illustrates a server, in accordance with a preferred embodiment of the invention.

FIG. 2 schematically illustrates a server 16, in accordance with a preferred embodiment of the invention. A program 30 is run at server 16 and generates a display to be viewed. This display is preferably drawn in a window on a virtual display 32. The window portion of display 32 is compressed, preferably to comply with the MPEG II standard. This compression may be performed by a standard MPEG II compressor. However, in a preferred embodiment of the invention, a special MPEG compression algorithm is used which take into account the type of display being generated.

It should be appreciated that although an MPEG II compression is assumed in many of the examples described herein, the invention is not limited to being used with MPEG II compression. Rather, many other compression mechanisms may be used, including advanced versions of MPEG, Quick time, wavelet compression, AVI and propriety compression protocols used by some multimedia data compressors.

The compressed display is then preferably physically encoded using a transport encoder 36 and mixed into an output video stream using a mixing box 38. User input is preferably filtered out by mixing box 38 and then directed to program 30, in a manner which emulates natural keyboard an/or mouse input to the program. Alternatively or additionally, especially when a special input device 20 is used, for example a remote, a special device driver in server 16 converts the user input into a format which can be assimilated by program 30.

In a preferred embodiment of the invention, server 16 runs a plurality of programs 30', the displays of which are all compressed, encoded and mixed into a cable wire signal. Preferably, the plurality of programs all run on a single CPU. Alternatively or additionally, server 16 may comprise a multi-CPU platform. Preferably, all the programs share a single virtual display. Alternatively, at least some of the programs may utilize a separate virtual display. Preferably, MPEG compression processes for a plurality of programs are performed by the same CPU. Alternatively, server 16 may include a plurality of DSP cards, which can be dynamically assigned to perform the compression. Preferably, all the compressed displays are transport encoded using a single transport encoder, alternatively a plurality of encoders may be used. Preferably, such a plurality of encoders are dynamically assigned for a display frame. Preferably, the encoders are genlocked and/or frame locked.

In a preferred embodiment of the invention, the various programs independently utilize system resources of server 16. In some cases, an operating system, such as windows NT or UNIX may support multiple users on a single system. Alternatively or additionally, server 16 may include software which captures operating system requests from the different programs 30 and then handles the requests in a manner which is transparent to the programs. One example of such a resource is cursor position. Another example is copy and paste commands in which a separate cut-buffer is preferably maintained for each program and/or user, so that copy and paste commands on different programs do not interact.

In a preferred embodiment of the invention, an overlay generator 40 is used to add an overlay to virtual display 32. Such an overlay may be used, for example, to add a cursor. Alternatively or additionally, the overlay is used to add user specific information which is not known by the program but which is tracked by server 16, for example connection time.

In a preferred embodiment of the invention, overlay generator 40 and/or other elements of server 16 may be used to add an overlay to a TV program channel, especially a compressed channel. Such an overlay may include WWW pages, program outputs, links and/or dynamic and/or static displays.

In a preferred embodiment of the invention, each program 30 has assigned to it also a virtual audio card, for outputting sounds generated by program 30. Alternatively or additionally, each program 30 has assigned to it a virtual video card. Preferably, the video output of the card are displayed in a window on the display. Preferably, the inputs and/or outputs utilized by program 30 are also managed as virtual devices, for example a virtual mouse and/or keyboard. In a preferred embodiment of the invention, additional virtual input and/or output devices may be associated with each program. One example of such a device is a modem, for a user downloading information to program 30. Another example is a voice input channel, preferably with speech recognition. Preferably, the virtual devices are assigned from a pool, on a demand basis. Alternatively or additionally, a single virtual device is used for a plurality of programs and the device driver is operative to individually service a plurality of programs so that there is no undesired interaction between the programs.

In a preferred embodiment of the invention, a portion of virtual display 32 may be viewed on server 16, for monitoring purposes. Alternatively or additionally, such a portion may be viewed from a remote location, preferably, by a remote system manager. Alternatively or additionally, a plurality of displays for individual programs may be displayed simultaneously, preferably with each one being reduced in size and with a plurality of program windows being displayed on a single monitor. In a preferred embodiment of the invention, server 16 is operative to record audio, displays and/or inputs for a particular program or for a plurality of programs. Such recording is preferably initiated by a system manager or by a user of the program. Preferably, an indication of such initiation is made directly to server 16 and bypassing program 30.

In a preferred embodiment of the invention, server 16 is connected to a printer and/or video or audio recording devices, such as a DVD. Preferably, a user can print text or graphics and/or record a multi-media segment using these devices and the hard copy is preferably mailed and/or otherwise delivered to the user.

In some preferred embodiments of the invention, mixing box 38 is used to connect to different types of networks, in addition to or instead of a cable network. In one preferred embodiment of the invention, mixing box 38 is used to connect to a telephone line. Preferably, a single data channel is transmitted over a plurality of lines. Alternatively, compression algorithms adapted for telephone lines may be used. Alternatively or additionally, an ISDN line may be used.

Preferably, set-top box 14 is modified so that it can also connect to the same type of network that mixing box 38 is connected to. Alternatively an additional adapter box is used to adapt from one network to the other.

In a preferred embodiment of the invention, a computer is directly connected to the network instead of through a set-top box. In one preferred embodiment of the invention, a LAN or a WAN is used to connect server 16 and the computer. Preferably, the compressed video data is transmitted as data packets over the network.

Figure 3:
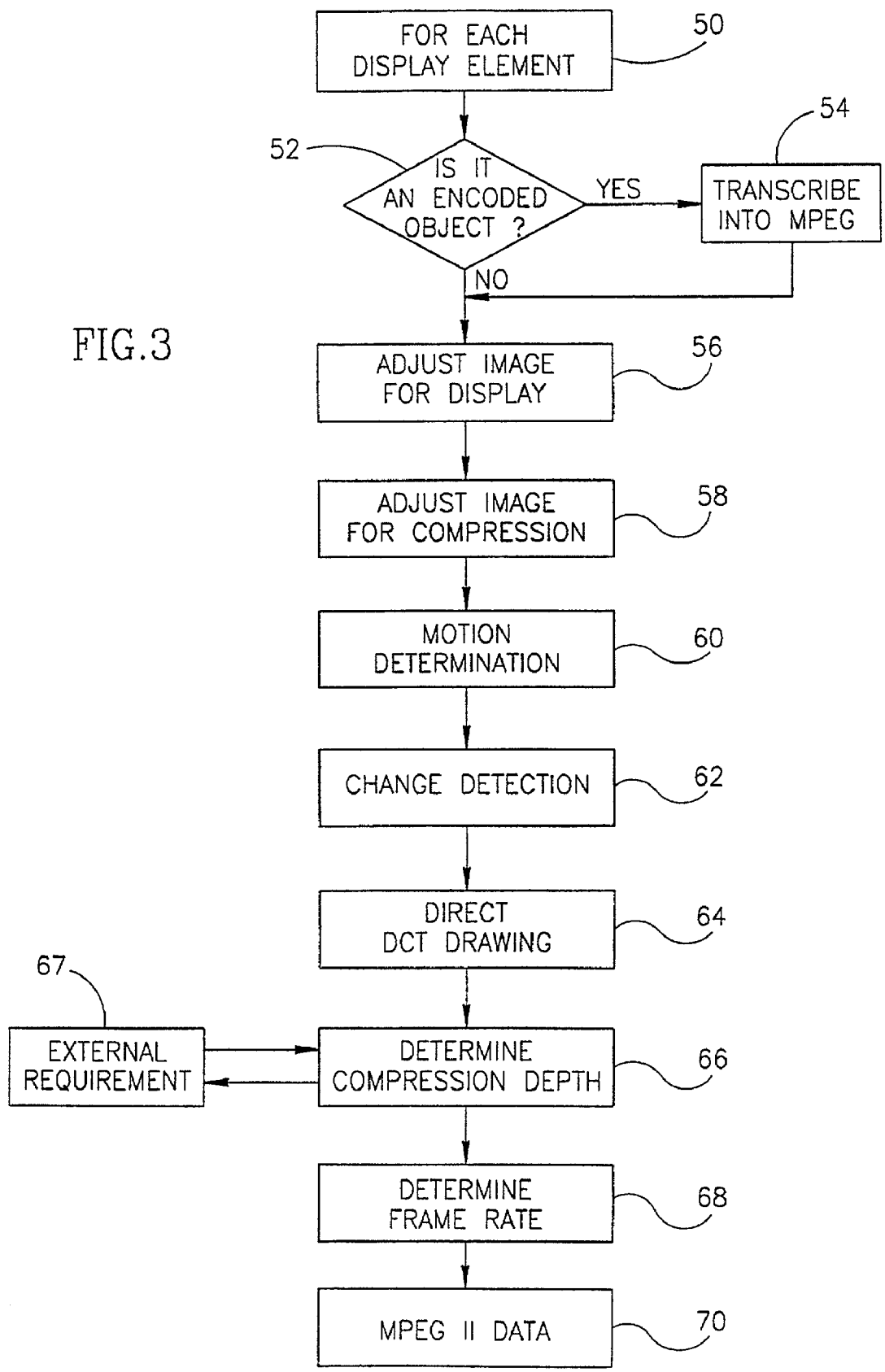
FIG. 3 is a flowchart for a method of generating a compressed video stream, in accordance with a preferred embodiment of the invention.

FIG. 3 is a flowchart for a method of generating a compressed video stream, in accordance with a preferred embodiment of the invention. This flowchart is preferably repeated (50) for each display element, where a display element is a graphical primitive or object which is drawn by program 30 or by the operating system. Alternatively, an entire display is built and then compressed. Alternatively the display is processed on a block-by block basis and each display element is a block or a portion thereof. Preferably, the block size is 8×8, 16×16 pixels or another multiple of the MPEG block size. It should be appreciated that different parts of the flowchart may be applied with a different granularity. For example, some of the flowchart may be performed on a frame-by-frame basis, while other parts may be performed on a block-by-block, super-block-by-super-block or element-by-element basis.

In a preferred embodiment of the invention, all the steps of the flowchart are performed. However, in other preferred embodiments of the invention, fewer than all the steps may be performed, for example even only a single step may be performed.

If the display element is an encoded object (52), for example compressed video or audio, the compressed data is preferably transcribed (54) into the MPEG stream, rather than decompressing and re-compressing it. When the object is displayed on the virtual display using a WWW browser, a special viewer is provided for this type of multimedia object so that the data is transcribed to the MPEG stream instead of being decompressed, "displayed" and re-compressed. When the object is displayed using the operating system of server 16, a similar transcription is performed. In a preferred embodiment of the invention, the resolution of the transcribed stream may also be controlled, for example, by re-quantizing DCT coefficients in MPEG and JPEG data. Preferably, the resolution is controlled to match bandwidth restrictions and/or quality restrictions.

Different transcriptions are preferably used for different types of compression, since the type and amount of reusable data is dependent on the type of compression. For JPEG compressed images, the DCT coefficients may be reused. Once the image is transmitted once, it does not change, so only motion vectors are required to describe it in future frames. MPEG compressed streams may be simply copied. Some types of video compression do not use the DCT transform but do contain motion estimation parameters which are reusable by the MPEG compression process. The MPEG standard supports several types of audio, which types can be simply copied from the input to the MPEG stream. Alternatively or additionally, to compressed streams, other types of encoded data may be transcribed, for example, the encoded data may contain display commands, which may be directly converted to compressed video, without rendering the commands, as described herein.

In a preferred embodiment of the invention, the display is adjusted for the TV display (56) and/or to make the compression more efficient (58). These two types of adjustments may interact, however, for simplicity of description they are described separately. A TV display has several characteristics which not as good as and/or different from a computer display, including, resolution, frame rate, CRT scanning path, flicker problems, aspect ratio, viewing distance color resolution and interlacing. The lower resolution typically requires increasing a font size used or using a more-readable font than required for a computer display. Flicker problems are typically caused by thin horizontal lines, which are preferably replaced by thick horizontal lines. Alternatively or additionally, low pass filtering is applied to the image, at least in the vertical dimension. In a preferred embodiment of the invention, such a low pass filtering is applied by reducing the quantization of the vertical frequency coefficients, after the image is transformed, at least of the high frequencies. It should be appreciated that filtering in a DCT space is not multiplication. However, such filtering may be approximated by multiplication. Preferably however, a look-up table is used to perform filtering. Most preferably, the filtering is performed during the quantization, preferably embodied in the quantization look-up table.

The aspect ratio difference is preferably solved by pixel interpolation. The increased viewing distance for TV is preferably adjusted for by increasing the font size. The color resolution of a TV per-se may be the same as a computer display. However, both the MPEG II standard and most TV transmission standards utilize a lower spatial resolution for color. Preferably, display elements which depend on color resolution for their discernability are enlarged and/or the colors used changed. In a preferred embodiment of the invention, the display is modified so that it is suitable for vision-challenged individuals. Preferably, such modification is personalized to the visual abilities of a particular user, which abilities may be associated with the user or which abilities may be entered by the user.

There is preferably a two-way interaction between computer generated displays and MPEG compression. The MPEG compression affects how the display will look and the content of the display affects the efficiency and speed of the MPEG compression. First, some types of displays elements require many more bits to compress than other types. Second, some types of display elements are degraded to a greater amount than other elements, by a same amount of compression. Third, some types of display elements are easier/faster to compress than others. In a preferred embodiment of the invention, display elements are modified so that they look better, are easier to use and/or faster to compress than the original display elements. Some examples include, manipulating colors so that the color components can be compressed to a greater degree; moving elements, such as bullets, so that they do not straddle block boundaries; using fonts with fewer high-frequency components; reducing flashing rates of colors and cursors and/or synchronizing them with each other and/or other display changes; reducing animation rates of animated objects; low-pass filtering, to reduce display resolution; and/or reducing scrolling resolution, for example to be limited to blocks and/or super-blocks, so that motion estimation only involves moving of whole blocks. In a preferred embodiment of the invention, a scrolling below a certain resolution is not shown and/or is rounded up to a nearest number of pixels divisible by 8.

In a preferred embodiment of the invention, color manipulation and/or other types of image adjustment, except possibly for aspect ratio correction, are not performed on multimedia segments which are downloaded from the Internet.

Preferably, some or all of these adjustments are performed by changing settings of program 30 and/or of the operating system. However, in some cases, these adjustments may be simpler to perform as a post-processing step during the display compression (58).

In a preferred embodiment of the invention, motion estimation is performed utilizing a knowledge of the structure and/or build-up of the display, instead of or in addition to analyzing consecutive frames of the display (60). Preferably, this knowledge is gleaned from the graphics commands generated by program 30. Alternatively or additionally, especially in an Internet browsing embodiment, this knowledge is gleaned from HTML, Java or JavaScript commands downloaded from the Internet. Similarly, changes in a display which are described below as being performed by modifying display commands, may also be performed by modifying HTML files, possibly in a preprocessor to the browser.

In a preferred embodiment of the invention, special note is taken of scrolling commands, which define a motion vector for portions of the display. Text based displays usually involve a significant amount of scrolling. Even graphics based displays may contain a significant amount of scrolling, since the display is often only a window into a large underlying data space. Preferably, very large motion vectors are allowed, for example as long as 200 pixel long. Typically, the vectors will comprise integer numbers of pixels in the X and Y axis components. It should be appreciated that there are several types of "scrolling" type commands, including:

(a) scrolling of a portion of the display when a user enters text in a word processor;

(b) scrolling of a scrollable display element;

(c) moving a window and/or a display element on the display;

(d) horizontal and/or vertical motions of blocks of image information; and/or (e) scrolling of an entire horizontal or vertical swath of a screen or of the entire screen.

In a particular example, when a WWW page is being downloaded, portions of the display are moved around as new images and their sizes are downloaded. In a preferred embodiment of the invention, portions of the display are moved using scrolling-type commands, so that only motion vectors need to be transmitted by the compression mechanism.

In a preferred embodiment of the invention, some of the data may be scrolled to or from outside of the viewing area. Preferably, scrolled out data may be retained by the MPEG decompressor, for use when such data "moves" back into the displayed area.

In addition, determining motion vectors by image analysis can generally be performed more efficiently in most computer generated displays than in acquired image streams. When a section of a computer generated display moves, it is usually copied, so a perfect correspondence between the source and the destination can be expected and searched for. In a preferred embodiment of the invention, the computer program is limited to movements of units of 8 or some other number, preferably integer, so that motion estimation is faster and/or does not required pixel interpolation. Alternatively or additionally, the virtual device driver translates scrolling commands into units which are divisible by 8.

In a preferred embodiment of the invention, changes are detected by focusing on pixels which were rendered and or on areas on which display commands operated (62).

In a preferred embodiment of the invention, graphical elements are drawn directly (64) into a transform space, such as a DCT space or a wavelet transform space, instead of first being drawn and then transformed. Some graphical elements can be reused (their DCT coefficients reused), for example, window borders, standard buttons, bullets, letters, icons, menus and/or some images. Graphical elements can be reused between downloaded web pages, between programs, between users and/or between different frames of the same program. Preferably, a cache of DCT transformed web pages is stored in addition to or instead of a cache of HTML files. In addition, basic graphical elements can be drawn directly as DCT coefficients, for example, pixels, line, combinations of primitives and transformed primitives (zoom, rotate).

In some cases there is a simple analytic formula connecting the original DCT coefficients and the transformed ones, for example in rotations, zoom by an integer number and decimation by an integer factor. When two primitives are both drawn in the same block, the coefficients are added. In a preferred embodiment of the invention, the coefficients are linearly added. Alternatively or additionally, the adding takes into account the quantization and is preferably performed using a look-up table. In a preferred embodiment of the invention, when the primitives overlap, they are split into non-overlapping portions and overlapping portions. The non-overlapping portions are simply drawn. The drawing of the overlapping portions depends on the type of interaction (such as bitblt command) between the two primitives. In some cases, a sum or an average of their DCT coefficients generates a good graphical representation.

Alternatively or additionally, other processing may be performed on DCT coefficients, prior to them being drawn into said DCT space, for example, rotation, quantization, smoothing and/or thresholding.

In a preferred embodiment of the invention, the DCT coefficients for some primitives are calculated on-the-fly, using analytical formulae. In one example, a single pixel, DCT coefficients for a pixel at a location (x0, y0) in a compression block yields the following DCT coefficient value for coefficients (k, i): $\cos(2\pi x_0*(k+0.5)/8)\cos(2\pi y_0(i+0.5)/8)$. A line is preferably drawn as a series of pixels, each of which may be "rendered" using the above formula. Preferably, a line is first divided into line segments, each of which is included in a single compression block.

Alternatively or additionally, the DCT coefficients for basic objects are stored in tables, corresponding to positions of the object within the block. Preferably, display elements are modified so that they match a table entry and/or an analytic transformation is used to modify them. It should be appreciated that in some preferred embodiments of the invention, standard display portions, such as borders and menus change rarely on the display, so that they are only infrequently compressed and/or retrieved from an appropriate lookup table.

In a preferred embodiment of the invention, display elements are moved so that they do not straddle compression blocks. Alternatively, or when the element is larger than a block, the element may be split between blocks. Alternatively or additionally, a look-up table stores coefficients for a 16×16 block. Alternatively or additionally, the 16×16 coefficients are calculated from 8×8 coefficients, by interpolation.

It should be appreciated that methods for direct drawing of elements into the DCT space and/or other transform spaces, for other compression methods, are generally suitable for parallel implementation, as the different coefficients can be set independent of each other.

Up to this stage, the transformation, as described, is generally loss-less, although lossy transformation (compression) methods and/or thresholds can be applied even at these early stages. Information compression is preferably achieved by quantization of the DCT coefficients. It should be appreciated that in many implementation, the transform step is integrated with the quantization step, so there may be no separating line between transformation and compression. In a preferred embodiment of the invention, a compression depth which requires lossy compression is determined (66). Preferably, the depth of compression is determined responsive to external requirements (67), such as available bandwidth or others, described below. Alternatively or additionally, the amount of lossy compression desired for the current display is outputted to an external environment, preferably as part of a negotiation for bandwidth. The desired compression depth may be dependent on the type of data displayed or on other parameters, described below.

Additionally or alternatively to determining the compression depth, the frame rate of the display is reduced to below a video rate (68).

In a preferred embodiment of the invention, a plurality of modifiable parameters are available for trading off image quality and bandwidth. Each of these parameters may have a range in which the image quality is minimally degraded and a range where the quality is significantly degraded. In addition, different parameters may have different effects for different images types. For example, the frame rate is not very important when viewing text, but it is very important when playing a computer game. The parameters which can be modified preferably include one or more of:

(a) frame rate;
(b) DCT coefficient sampling resolution;
(c) a motion estimation threshold, below which no motion is detected;
(d) a change estimation threshold;
(e) allowances for modifying the positions of objects, for more efficient compression;
(f) allowance for modifying the appearance of objects;
(g) color modifications;
(h) reduced resolution in imported multimedia objects, such as MPEG movies;
(i) accuracy of direct DCT drawing tables and transformations;
(j) different parameter values per portion of the display, per display element and/or graphical primitive; and/or
(k) a desired image quality.

In a preferred embodiment of the invention, different parameters have different levels of importance, depending, inter alia, on what is being viewed. Preferably, each program, TV set, user and/or combinations thereof are associated with a particular set of desired values for these parameters and their relative importance and/or minimal and/or maximal values. Preferably, these parameters are associated with a set-top box digital subscriber number.

Additionally or alternatively, different values of compression parameters may be defined for different parts of the display, for example, standard icons and menu bars may be compressed to a lower quality than unknown icons, since they are more easily recognized.

Additionally or alternatively, the compression and/or bandwidth requirements are dependent on a prediction of the future frames. In one example, if a JPEG image is being downloaded and displayed, less bandwidth will be required for a particular display portion than if an MPEG video is being downloaded and displayed.

In a preferred embodiment of the invention, the compression is performed using a variable-bit rate, while requiring a constant quality threshold. The quality threshold may be changed as a function of available bandwidth, as described above.

In a preferred embodiment of the invention, the compressed video signal may include two types of compressed data. For example, an MPEG portion and an AVI portion. However, this may require additional capabilities for the set-top box.

In a preferred embodiment of the invention, programming of the set-top box is updated from server 16. This updating is preferably performed while the TV is not in use. Preferably, the selection of the compression parameters is a function of the TV type (standard, digital or HDTV), its size and/or the capabilities of the set-top box with regard to its speed, programmability and memory. Preferably, more complex and/or efficient compression schemes are used for more sophisticated set-top boxes.

Although the above embodiments have been described generally with reference to MPEG compression, it should be appreciated that they may be applied for many types of compression practiced today, especially transform-quantize type compression methods. Non-MPEG compression types are also important when the display is not a two-dimensional raster display, for example, when the display is a three-dimensional raster display.

In a preferred embodiment of the invention, the method explained with reference to FIG. 3 is performed responsive to change events, which indicate to the image compressor that a change has occurred in an image of a display channel. Step 62, "change detection" is preferably utilized to determine if the change warrants an update to the image, based on, for example, the available bandwidth, available computing power and/or type of user connection. In a preferred embodiment of the invention, only the changed portion of the image is processed and a new output frame is assembled from the newly compressed image portions and, possibly, existing, unchanged compressed image portions. In a preferred embodiment of the invention, three kinds of frames may be generated:

(a) "I" frames, which include a complete image;
(b) "P" frames, which define changes over a previous image; and/or
(c) "N" frames which indicate that no changes are to be made.

As can be appreciated, it is desirable to minimize usage of computational resources as well as bandwidth resources. On the other hand, it is desirable to provide a fast feedback to at least some user interactions. Alternatively or additionally, it is desirable to maintain a fixed frame rate at the display unit. Alternatively or additionally, the MPEG decompressor may be modified to allow variable frame-rates.

In a preferred embodiment of the invention, the compression-display process is asynchronous, so that each part of the pipeline, e.g., image generation, compression, transmission and decompression-display, may be separately optimized and/or otherwise controlled.

In a preferred embodiment of the invention, the decompression-display is maintained at a fixed frame rate by buffering "I" and "P" type frames with "N" type frames, to maintain a desired frame rate. In a preferred embodiment of the invention, the "N" type frames are evenly distributed in the video stream. In a preferred embodiment of the invention, the distribution of "N" frames is used to effect a statistical multiplexing of "new" frames between a plurality of channels.

In a preferred embodiment of the invention, the compression is asynchronic, generating new compressed data only when a change has occurred in the image. This allows the image generating program to run at screen-update rates, possibly unrelated to the compression frame rate. Alternatively or additionally, at least some of the image generation—display process is synchronized, for example, by buffering the communications between differently synchronized portions of the image generation, compression and display system. In one example, change events may be queued and then processed (to effect image compression) at the desired frame rate. Alternatively or additionally, the compression and/or transmission portions may control the image generating program, for example to slow down and/or provide only certain types of output. In one example, the operating system may reduce the CPU slicewidth of a program which is generating output too fast.

Alternatively or additionally, change events may be asynchronously queued and/or delayed. In a preferred embodiment of the invention, such delaying is performed which there are momentary limitations on computing power and/or on transmission bandwidth. In a preferred embodiment of the invention, two or more change events may be combined so that only a single portion of an image is compressed. In one example, two scroll commands can be combined into a single "scroll" event. Alternatively or additionally, some types of change events may be discarded, for example based on a threshold and/or on an image quality requirement.

Alternatively or additionally, when an image portion is compressed, generation of frames may be delayed, responsive to limitations in computing power and/or bandwidth. In some cases, some image portions may be delayed long enough that a newer version of the portion overrides them. Alternatively or additionally, such delays and queuing in compression and frame generation are responsive to a desirable compression-output frame rate.

In a preferred embodiment of the invention, motion and/or change information is provided as "side" information to the compression process. Such side information may be generated by the program, by analyzing the commands sent to the virtual display driver and/or by analyzing the results of the display commands.

In a preferred embodiment of the invention, different compression levels and/or other parameters are organized in sets. A particular set is preferably selected based on the available bandwidth, computing resources and/or other factors which are described herein as affecting the compression.

In a preferred embodiment of the invention, even when the frame rate is low, certain portions of the display may be updated at a faster rate, for example, to provide feedback for a mouse action, mouse motion and/or keyboard entry. This may be achieved by sending MPEG frames in which the only blocks changed are those for which feedback is required. In a preferred embodiment of the invention, the user input channel is fast and asynchronic, so that it is not delayed by frame-rate considerations.

In a preferred embodiment of the invention, different change events have different priorities and may therefore "pass" queued and/or delayed events, in the image generation-display pipeline. For example a change event related to a response to a user input, e.g. cursor motion, may have a higher priority that a system status display. More than two priority levels may be defined. In a preferred embodiment of the invention, each priority level may have associated therewith a "frame rate" at which change events and/or other processing associated with the event are handled. Alternatively or additionally, each priority level may have other information associated therewith, for example, allowed delay time and/or error correction level.

In a preferred embodiment of the invention, blocks associated with high priority levels of change events may be automatically determined even without an indication from the program. In one example, such changes are detected by capturing "windows" commands, such as cursor movement and shading of menus.

Figure 4:
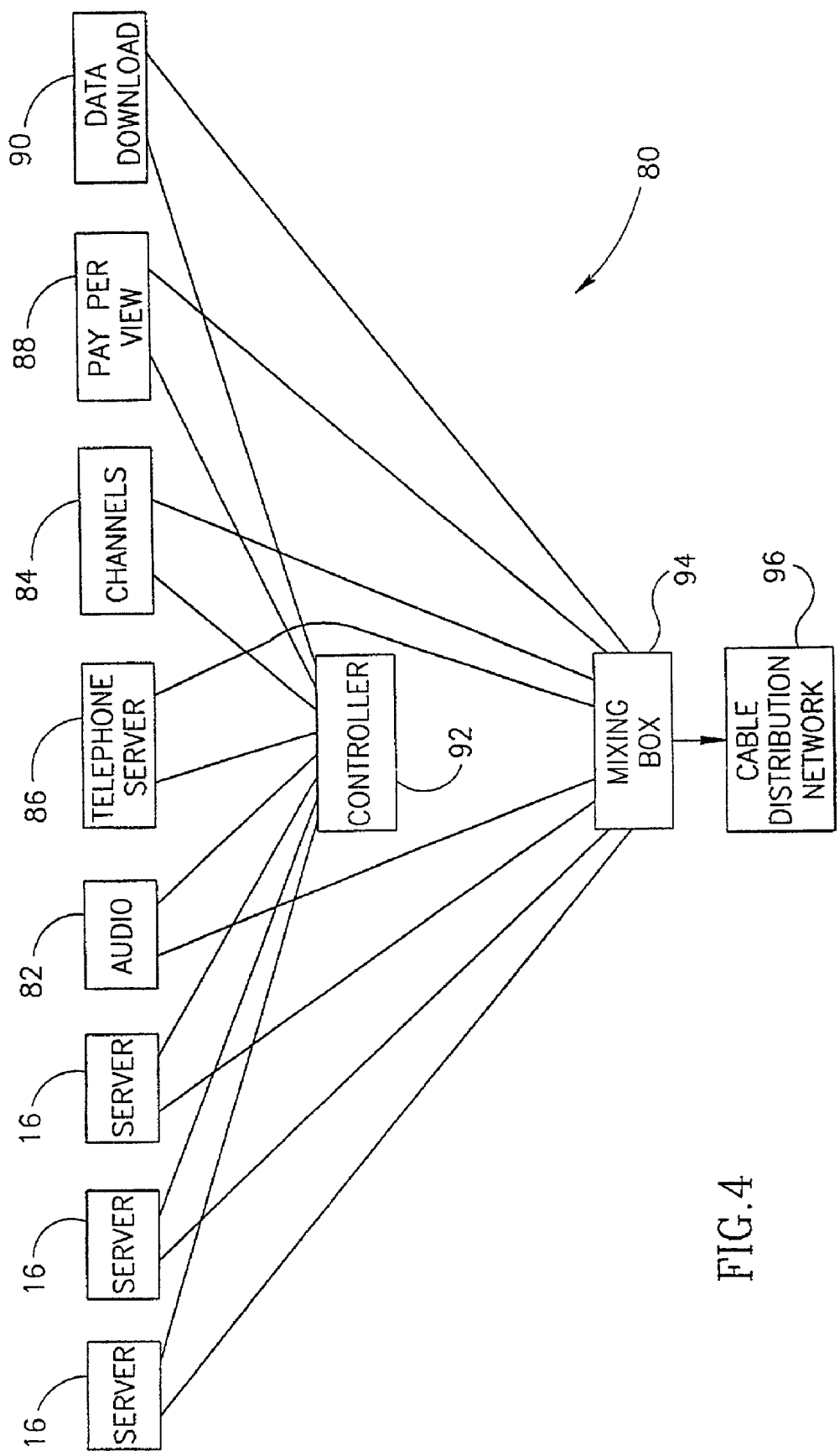
FIG. 4 is a schematic diagram of a cable operator configuration, in accordance with a preferred embodiment of the invention.

FIG. 4 is a schematic diagram of a cable operator configuration 80, in accordance with a preferred embodiment of the invention. In a typical cable distribution network, bandwidth must be allocated between many services, including one or more of a plurality of viewing channels 84, a plurality of pay-per-view movies 88, data downloading from remote sources 90, telephone and video-conferencing services 86 and audio channels 82. Additionally, not shown are bandwidth requirements for data traveling from subscribers to cable operator 80. In a preferred embodiment of the invention, this last bandwidth is also shared with one or more servers 16, which provide remote computer access to subscribers. Preferably, a controller 92 assigns bandwidth portions to different ones of the services. The video and/or data streams from the services are preferably mixed using a mixing box 94 and distributed using a cable distribution network 96. Although FIG. 4 generally describes a centralized system, in some preferred embodiments of the invention, the configuration is distributed. For example, a plurality of servers may be provided with each one serving a small locality. At need, a local server may be utilized to server a more remote location. In a preferred embodiment of the invention, the cable operator has a centralized connection to the Internet and Internet data is transmitted using a cable data connection from the Internet connection to a server 16 which requires it. Alternatively, a plurality of such Internet connections may be provided.

In a preferred embodiment of the invention, a certain amount of bandwidth is assigned by the cable provider for use of server 16. Preferably, controller 92 trades-off between the various services and/or between the bandwidth requirements of different servers. Preferably, the available bandwidth for each client/server channel is constantly changing to reflect the instantaneous availability of bandwidth and/or the needs of the various services. In a preferred embodiment of the invention, a statistical multiplexing of bandwidth is performed between the channels so that the average available bandwidth for each channel is as desired. This allows a momentary higher bandwidth for a particular channel, if required. Alternatively or additionally, this allows asynchronic transmission of the different channels.

In a preferred embodiment of the invention, the relative bandwidths assignments for each user of servers 16 are adjusted. In accordance with one preferred embodiment of the invention, the bandwidth is assigned between users so that a same compression depth is achieved for each one. Alternatively or additionally, the bandwidth is divided up so that a constant quality measure is achieved for each user. The quality for each user may be defined using quality measures well known in the art. Alternatively or additionally, the quality measures may be dependent on the compression parameters sets described above, which define which compression parameters may be degraded, to what extent and/or what consequence is allowable. Alternatively or additionally, bandwidth is divided up so that a moving-window average of bandwidth is the same for each user.

In a preferred embodiment of the invention, some users receive more bandwidth than other users and/or are more likely to retain their bandwidth in case of bandwidth shortage. Preferably, users can order a certain minimal and/or average bandwidth ahead of time. Alternatively, a user can require a certain minimal and/or average frame rate and/or a maximal and/or average image degradation.

It should be appreciated that different computer displays require different amounts of bandwidth, for example, static text displays require less bandwidth than graphical animation. Preferably, an average bandwidth is achieved by statistically assigning more bandwidth for complex displays and less bandwidth for simple displays.

Additionally or alternatively, the average bandwidth requirements for particular programs and/or WWW sites may be stored so that the required bandwidth may be better estimated.

Alternatively or additionally, programs which generate displays may be slowed down so that the bandwidth required is lower. In one example, downloading of information is slowed so that it is displayed slower. In another example, a computer game is slowed down and/or its frame refresh rate lowered and/or its image definition reduced so that its bandwidth requirements are lower. One way of reducing image definition is by providing a virtual display with a reduced resolution and/or drawing with a reduced resolution.

In a preferred embodiment of the invention, TV programming, especially video-on-demand programming, but possibly also other types of TV channels, include hints for statistical multiplexing. These hints may include an indication of the content of a frame or frames of video. Alternatively or additionally, it may indicate a required bandwidth. Alternatively or additionally, it may indicate an allowed quality reduction. Thus, when two such channels are statistically multiplexed, for example, as performed in an "iMedia" system, the multiplexing can take into account the content of the channels and not only their statistical properties. Such hints may be transmitted on a data channel. Alternatively or additionally, these hints may be provided with a stored TV programming sequence. Alternatively or additionally, the hints may comprise hints for advertisement insertion, for example, an indication of a portion of a frame which may be replaced by an advertisement. These display portions may be replaced with compressed video advertisements, without decompressing the source channel, for example by replacing compressed image blocks.

It should be appreciated that by controlling the compression and/or the programs and/or the downloading of data, very fine control over bandwidth, image quality and/or tradeoff between them may be achieved, with a fast response time.

In a preferred embodiment of the invention, subscribers are charged for utilizing servers 16 and the bandwidth used on cable distribution network 96. Such billing may be a function of several charge methods, including one or more of the following and/or combinations thereof:

(a) per hour usage of server 16 and/or network 96 and/or Internet connection;
(b) per CPU second of server 16;
(c) per second of time for MPEG compression;
(d) flat fee;
(e) per NPEG byte transmitted to user;
(f) per data byte downloaded from the Internet;
(g) per storage at server 16;
(h) different rates for different programs used, per usage time or per usage time and/or count of these programs;
(i) per hardcopy generated, possibly including cost of mailing and/or messenger to the user;
(j) per data transmitted from the user to server 16;
(k) advertisement level, where cable TV charges may be lower if a higher advertisement level is allowed; and
(l) incentive payments, for example based on the actual advertisements viewed.

In addition, the actual rate may be a function of one or more of:

(a) the quality of data transmitted and/or the amount of modification of the data;
(b) limitations imposed by a user on the bandwidth or the quality;
(c) relative availability of the bandwidth; and/or
(d) variations in actual bandwidth.

In a preferred embodiment of the invention, the accounting for cable services and server 16 services are combined.

In a preferred embodiment of the invention, the usage of specific programs is tracked in order to pay royalties to the program provider and/or copyright owner.

In a preferred embodiment of the invention, advertisements are mixed into the compressed video stream.

In a preferred embodiment of the invention, advertisements are added to the compressed video stream which is sent to the client. The use of advertisements may offset some of the cost of providing the service and/or may provide an additional income source for the cable provider. In a preferred embodiment of the invention, advertisements are added to the video stream in a manner which will minimally affect using program 30 and/or browsing the Internet.

In one preferred embodiment of the invention, advertisements are displayed while waiting for an image or file to load and/or while a program is busy calculating. Alternatively or additionally, advertisements are displayed when server 16 is too busy to run program 30.

Alternatively or additionally, advertisements are added to the background of a display, for example underlying text. The background may be automatically detected either by its color or by the drawing command used to draw it, typically, a large single color rectangle.

Alternatively or additionally, advertisements are placed in unused portions of the screen, for example, large blank spaces. Preferably, the advertisements are moved and/or resized and/or clipped to reflect changes in the usage of the screen. In one preferred embodiment of the invention, an advertisement is minimized to an icon, which a user can open at will. Opening such an icon may create an overlay an underlay and/or other changes in the display, in addition to or instead of opening a window with the advertisement.

Alternatively or additionally, advertisements are non-rectangular. Preferably, an advertisement is selected to fit the size, shape and/or aspect ratio of an available area.

Alternatively to selecting the advertisement, an existing advertisement may be modified so that it meets time or space constraints. Preferably, advertisements are inserted into areas of the display into which images and/or video is being downloaded from the Internet.

Alternatively or additionally, an advertisement may be used to replace screen elements which are drawn by the operating system of server 16 or by a standard program thereon. For example, an advertisement (static or live) may be used to replace the cursor, an icon and/or a per-program defined section of the screen.

In a preferred embodiment of the invention, a program and/or a WWW browsing session may be modified using a suite of advertisements. In an example of a soft-drink company, the cursor is replaced with a bottle icon, loading images are replaced (during loading) with well known advertisements and system messages are replaced with messages which include a soft-drink related content.

In a preferred embodiment of the invention advertisements and/or programs have associated with them scripts which define where advertisements can be inserted. The scripts are preferably written in an interpreted language, such as Visual Basic.

In a preferred embodiment of the invention, the advertisements are inserted in a different sensing modality from what is used by a user. for example, if the user is using a visual display, audio advertisements may be used, and vice versa. In particular, when a program is generating (only) a sound track, a visual advertisement may be displayed.

In a preferred embodiment of the invention, server 16 automatically detects the activation of a screen-saver mode and replaces the screen saver or a portion of it with an advertisement. Alternatively or additionally, an advertisement may be displayed and/or sounded if the program is not in use or no user input is detected for a certain amount of time.

In a preferred embodiment of the invention, an artificial pause in the usage of program 30 is inserted (for the advertiser) and an advertisement is displayed on all or part of the display. Preferably, certain times in the execution of program 30 are defined as being less amenable to being interrupted. In one example, advertisement breaks are inserted if a user stops typing for a certain amount of time, after he types a period or after he performs a save operation (in a word processor). In another example, advertisement breaks are added to a browsing section when a new page is entered and a considerable amount of data is to be unloaded.

In a preferred embodiment of the invention, an advertisement may be stopped or artificially shortened, when a user starts entering input or when an image download is complete. Preferably, preferred ending points and/or sections to be skipped are defined for the advertisement, so that the break is clean.

In a preferred embodiment of the invention, the expected duration of time during which an advertisement can be displayed and/or the size of area and changes in the size may be determined responsive to the activities which are being performed by the user. In one example, the time to download an image download can be estimated. This estimation may be used to select an advertisement which is just the right length or to select a plurality of consecutive advertisements. If the download rate changes, the advertisement may be shortened, lengthened or replaced, accordingly.

In a preferred embodiment of the invention, the user can indicate to server 16, preferably bypassing program 30, annotations for particular advertisements. In particular, a user can indicate to the server an advertisement which he wishes to view again, an advertisement which he find offensive and or to indicate a general level of advertisement content which is acceptable (or example for parental control purposes). Additionally or alternatively, a user can provide feedback to an advertisement. In one example, a user can browse a WWW site associate with the advertisement. In another example, a user can place a telephone call or a video conference call, through the cable network to a location associated with the advertisement.

Various types of advertisements may be used, including:
(a) static images;
(b) animation by a slowly changing image sequence;
(c) animation using a graphical program run at the server;
(d) silent video;
(e) audio; and
(f) video with sounds.

In a preferred embodiment of the invention, the advertisement includes a pre-defined frame rate, which may change over the duration of the advertisement.

In a preferred embodiment of the invention, the advertisements are pre-compressed. Alternatively or additionally, the advertisements are DCT transformed and/or motion compensated, but not quantized. Preferably, the quantization is determined in the fly, as part of the bandwidth considerations. Alternatively or additionally, the frame rate and/or size and/or shape are determined on the fly. In a preferred embodiment of the invention, the advertisement has associated with it "bandwidth suggestions", which are certain sets of compression parameters which define a local optimum in the tradeoff of bandwidth and viewing quality. Such definitions may be per portion of the advertisement.

It should be appreciated that the bandwidth which is devoted for the advertisement is not generally of interest to a user. In a preferred embodiment of the invention, the above described bandwidth optimizations and trade-offs are performed independently of any advertisement content. Preferably, portions of the image in which an advertisement will be placed are treated as portions which do not need to be transmitted.

In a preferred embodiment of the invention, the advertisement is purposely selected, preferably by server 16. Alternatively or additionally to a selection responsive to bandwidth and time considerations, such selection may be responsive to one or more of:
(a) WWW page content;
(b) a particular program being executed by a user and/or a particular action therein;
(c) demographics and/or other information associated with a user;
(d) statistical definitions of exposure to the advertisements;
(e) a desired temporal and/or modal distribution of a particular advertisement or product;
(f) language; and/or
(g) local geographical considerations, for example, local advertising.

In a preferred embodiment of the invention, a certain exposure of a user to advertisements and/or advertisement display rate may be desired. Preferably, when the rate is lower than desired, advertisements are inserted more often and/or longer advertisements are used.

In a preferred embodiment of the invention, a downloaded WWW page includes an indication of what advertisements to insert and where. The advertisements themselves are preferably stored locally at server 16 or elsewhere at cable operator 80. In a preferred embodiment of the invention, programs run at server 16 also have advertisements associated therewith, for example with certain actions and/or forms. In a preferred embodiment of the invention, the advertisement indications refer to a product or a group of products to be advertised. Alternatively or additionally, the indications are associated with an advertisement distributor.

In a preferred embodiment of the invention, server 16 downloads a files which contains up-to-date associations between advertisement indications and advertisements. In a preferred embodiment of the invention, the actual advertisements shown, their duration, their quality, an association with what the subscriber was doing at the time and/or a user response to an advertisement, are transmitted to an advertisement distributor so that royalty payments and/or payments to the cable company, can be determined.

In a preferred embodiment of the invention, advertisements are added to a WWW page by the portion of the browser which is supposed to display certain objects, such as AVI files. Preferably, the browser portion displays advertisements from a local storage while waiting for data to download so that the browser can display the real data.

In a preferred embodiment of the invention, other content, besides advertisement can be mixed with the display of program 30, using methods as described for advertisements. In a preferred embodiment of the invention, the content comprises TV channels, especially news and sports channels. This type of mixing is especially useful if the display of program 30 is relatively static.

In a preferred embodiment of the invention, advertisements are personalized, for content, at server 16 and/or the cable provider. In a preferred embodiment of the invention, such personalization may also be effected for non-Internet TV channels, for programs run at server 16 (such as a word processor) and/or for games. Thus, using any multi-media channel at a server 16 may require a user to view personalized advertisements. In another example, a software may require constant connection to the Internet in order to operate properly and/or in order to limit pirating of the program. Detection of the connection may be used for billing purposes and/or for sending personalized advertisements to be displayed by the program, even if the Internet connection does not utilize a configuration as described above.

In a preferred embodiment of the invention, each subscriber is assigned a private directory into which he can download information and store personal files. Preferably, the client is charged per space used. In a preferred embodiment of the invention, a user can download programs from the Internet or from home, into server 16 and run them at server 16. Preferably, such programs are run in a protected mode of the operating system so that they do not interfere with other programs. Alternatively or additionally, such programs are run on a separate server 16 from Web browsers.

In a preferred embodiment of the invention, a set-top box will only receive a channel if it matches a subscriber number of the set-top box. Alternatively or additionally, especially for channels viewable by multiple users, a channel may have associated therewith a plurality of subscribers numbers and/or a pattern which defines who may view the channel. In a preferred embodiment of the invention, the display is encrypted, such that only designated recipients may view it.

In a preferred embodiment of the invention, a password is hardwired into a set-top box. Alternatively or additionally, a password is entered by a user when logging unto server 16, for example for entering the Internet, at which point all transmission to the user may be encrypted responsive to the password. Alternatively or additionally, the password may be used for charging a user, so that a user may connect from different set-top boxes.

Alternatively or additionally, the system assigns a password to a user when he connects, based on the content the user is viewing. In one example a single password may be provided to a plurality of users viewing a same channel. Alternatively or additionally, each user and/or channel may be assigned a different password.

In a preferred embodiment of the invention, cable operator 80 comprises a plurality of computers, each suitable to run one or more programs 30. These computers may be organized in different servers 16. Alternatively or additionally, a plurality of computers may be included in a single server. In one preferred embodiment of the invention, different user's programs are run on different computers, depending on the relative load on the computers and/or the expected processing power required for compression and/or the expected processing power required by a particular program 30. In a preferred embodiment of the invention, a user can "rent" a particular computer for a certain amount of time to be wholly or partly dedicated to his needs. Alternatively or additionally, different programs 30 are run on different computers, for example, browsers are run on one computer and interactive games are run on a different computer.

In one preferred embodiment of the invention, a program is run on a first computer and the conversion of display command to compressed video is performed on a different computer. Preferably, this is achieved using a network windows operating system, such as X11, whereby the display commands for X11 are sent to the different computer to be converted there to an MPEG stream.

Alternatively or additionally, programs 30 may be moved between computers, preferably in a manner transparent to the end-user. In a preferred embodiment of the invention, each computer has a backup computer running the same programs, so that if the first computer crashes, the execution of the programs may be passed, preferably seamlessly, to the second computer. Alternatively or additionally, the computers share one or more storage disks. Alternatively or additionally, the distribution of programs 30 on the backup computers is different than on the live computers, so that the probability of a crash repeating itself and/or affecting the same programs 30, is reduced.

As can be appreciated, it is not generally desired that individual programs 30 are aware of other programs 30 being executed on the same server by a different subscriber. In addition, it is not usually desirable that a program 30 be aware of the transmission of the display by compressed video.

In an alternative preferred embodiment of the invention, program 30 is aware of the display and/or input situation. Preferably, such a program modifies its output and/or processing responsive to what is happening on the server and/or responsive to requests from the server. Preferably, program 30 is written for or adapted for a remote access configuration as described herein.

In a preferred embodiment of the invention, the execution of a program is affected by the display of the program results. In one example, when the display bandwidth is reduced, the rate at which displays are generated is also reduced. Alternatively, the display is slowed down. For example, if the display is paused, the program may also be paused. The opposite situation is also possible, if a program requires less display bandwidth, it may be allotted a higher share of the execution time. Alternatively to adjusting the execution rate to meet the display bandwidth requirements, the display bandwidth requirements may be adjusted to meet execution rate requirements. Alternatively or additionally, a program 30 may be slowed down if not enough CPU is available for it. Preferably, the relative ranking between programs with regard to display bandwidth and/or CPU availability is a property of the program which a subscriber can adjust and/or where he is billed for increased availability.

In a preferred embodiment of the invention, a user can perform remote cross-platform application execution, using methods described herein. A remote program is attached to a virtual display and input device, the display is provided to the user as described hereinabove and the user's input is provided to the remote location as described hereinabove. Preferably, the display for the remote program is shown as a window on the user's computer. Alternatively or additionally, the location of a pointing device, such as a mouse cursor, overlaid on the compressed video image is translated into a location relative to the remote program's window, prior to transmission thereto of the location.

In some preferred embodiments of the invention, two subscribers are allowed to interact via the interactions of their respective programs. Alternatively or additionally, a single subscriber may execute more than one program simultaneously on server 16, and be able to switch between them and/or pass data between them and/or allow them to otherwise interact, for example as provided in the Windows95 and/or Unix operating systems.

In one preferred embodiment of the invention, group games and/or group simulations are allowed in which a plurality of players interact. In one preferred embodiment of the invention, group games are run on a single computer which generates a plurality of display streams. Typically, a network connection will need to be simulated between such game programs. Alternatively, each program is run on a different computer at cable operator 80, which computers are connected by a LAN. In Internet group games, an Internet is preferably simulated between the games, instead of actually passing all the interactions through the Internet.

In a preferred embodiment of the invention, one subscriber can monitor the operation at one or more other subscribers, preferably by having their compressed video stream incorporated into his video stream. In one preferred embodiment of the invention, such monitoring is part of a help desk operation, so that a help desk operator can see exactly what a subscriber, with a problem, is seeing. Preferably, the helpdesk operator has the option of taking over the operation of a mouse and/or keyboard of program, overriding the subscriber. Alternatively or additionally, simultaneous input from both helpdesk operator and subscriber is allowed.

In a preferred embodiment of the invention, interactive tutoring may be performed. Since both the tutor's and the student's programs are running on the same computer or a networked computer, communication between them is simplified and response time may be shortened. Alternatively or additionally, a display of the user may be transmitted, in full size, in reduced size or clipped to the tutor, so he can monitor the student more closely. Preferably, the display is clipped relative to the mouse. Preferably, a plurality of clipped areas are transmitted. Alternatively or additionally to transmitting the student display, the tutor display may be transmitted. If a camera is available at the tutor and/or the student, a camera feed may also be transmitted between them.

In a preferred embodiment of the invention, a user can generate a plurality of display channels. The plurality of channels may be generated by multiple windows of a single program, by multiple programs or by defining different parts of a single display to be outputted in different channels. Such separate channels may overlap in the virtual display space. Preferably, the user switches between the viewing the multiple channels. Alternatively or additionally, the user views two or more channels simultaneously.

In a preferred embodiment of the invention, a user and/or the cable operator generate a channel to be viewed specifically by other users. Preferably, a plurality of users can view the channel simultaneously. Preferably, at most one of the other users, if any, may provide input to the channel. Alternatively, when more than one additional user views the channel and/or provides input, the program which generates the channel is duplicated for each channel. Preferably, the programs comprises an unduplicated portion and a duplicated portion, so that a considerable amount of memory, CPU time and/or disk storage space may be saved. In a preferred embodiment of the invention, the program which generates the channel is not run and/or is paused while there are no subscribers connected to the channel. Alternatively, the program is run but the display is not compressed and/or not transmitted over distribution network 96. Alternatively or additionally, the program is run at a reduced rate and/or the display is compressed to a higher degree. In a preferred embodiment of the invention, program 30 generates its display based on other data channels in the cable network system. For example, program 30 can generate a channel which comprises a portion of a sports channel and a portion of a news channel, text downloaded from a WWW site and a calculated graph.

In a preferred embodiment of the invention, program 30 generates stereo video streams. In a preferred embodiment of the invention, a compression method which allows the transmission of stereo pairs is used. Alternatively, two video streams are generated. Preferably, the two stereo streams are synchronized with respect to their frame rate, image quality and/or relative phase. Preferably, the set-top box is capable of decompressing two video streams simultaneously. In a preferred embodiment of the invention, where a TV that is capable of tuning to two or more channels at a time is utilized, such two or more channels are provided by the set-top box. Multiple channels may also be used to transmit news, such as sport news on a secondary channel and/or to transmit advertisements.

In addition, there are other circumstances in which two or more display channels, generated by a single user or generated by different users are synchronized, for example if two such channels are viewed by a single user.

In a preferred embodiment of the invention, a single packet may belong to two or more channels. In one example, a packet may include data for a frame of a "Windows 95" window, which data is useful for many channels. In another example, a plurality of data channels may utilize a same "I" frame but at least some different "P" frames. By allowing overlap between packets, it is possible to provide a large number of personalized WWW pages, using a limited bandwidth. One example of a situation in which such overlap is useful is in a satellite WWW broadcast system, in which a satellite communication system having a limited bandwidth is used to provide cable/Internet/remote computing services to a plurality of subscribers. Another example is a microwave, coax or optical cable network, especially for a large area. Another example is a wireless transmission system, such as used for TV broadcasting.

In a preferred embodiment of the invention, a plurality of display channels are assigned for remote computer access. The assignment may be fixed or it may be variable, for example, depending on the availability of bandwidth and user requests for different types of multimedia channels. In a preferred embodiment of the invention, the assignment of WWW sites to channels is fixed. Alternatively or additionally, at least some of the assignments may change, for example by need (for example as is described below) or based on popular request and/or scheduling considerations.

It should be appreciated that there are many WWW sites that are view in substantially the same manner by a large number of people, for example, a news site. Such a site could be assigned a single channel. However, when a user follow a link from the site or scrolls the display, that user cannot force all the other users to scroll with him. In many cases however, only a small number of people will be scrolling at any given moment. In addition, the difference between what is being viewed by different subscribers may be limited to personalized advertisements and/or other personalizations of the WWW page. Thus, transmitting "P" frames containing only the changes from a globally available "I" frame require only a relatively small bandwidth. Once such a "P" frame is transmitted, a user can view only "N" frames until he makes his next request. In a preferred embodiment of the invention, when a user splits away from a group he is assigned a new channel number. After the change is transmitted to the user, the channel may start sending only "N" frames. Alternatively or additionally, the globally available channel transmits only "N" frames, with a periodic "I" frame. Alternatively or additionally, the user is switched to a standard channel which contains only "N" frame. In a preferred embodiment of the invention, depending on bandwidth limitations, a user may be limited in functionality, for example only to view WWW pages and/or follow links which have been selected by other subscribers. Alternatively or additionally, the system may delay in providing a channel with individualized "P" frames, until such a channel becomes available. In some cases, a user is presented with an hour-glass cursor, indicating that his request is queued. Alternatively or additionally, a message is displayed informing the user of the need to wait. Such a message may comprise "P" frames, for example from a standard channel. Alternatively or additionally, a link, a button and/or a menu item may be grayed out. Alternatively or additionally, a limitation on scrolling resolution may be used to reduce the number of required channels. Alternatively or additionally, the personalization of advertisements may be reduced.

Alternatively or additionally, to Internet channels, also TV channels can benefit from such sub-channeling. In one example, sub-channels may be used to provide advertising. Each locality may require a different advertisement program. In a preferred embodiment of the invention, the same channel includes several sets of "P" frames, which may refer to a same spatial potion of a display, for example to encode multiple possibilities for advertising for a same screen location. However, each end user will utilize only non-overlapping sets.

In a preferred embodiment of the invention, the listing of which channels to read data packets from and which of the data packets are relevant for a particular user, is provided in a data channel associated with one or more display channels. In a preferred embodiment of the invention, a plurality of WWW channels and/or variations on a single WWW site are provided in a single video channel, to reduce the need of physically switching between channels when reading video information.

In an alternative preferred embodiment of the invention, "P" and "I" frames can be computer files rather than compressed video information. In one example, an "I" file contains instructions on generating a basic display. A plurality of "P" files contain instructions on modifications of the display. An end user receives, for example on a data channel, a list of "I" and "P" to use to reconstruct a desired display channel. In one example, the computer files include HTML file sections. In another example, the files comprise display lists. In another example, the files include commands and/or definitions for a display generating language. For example, an "I" file may include calls to subroutines, which subroutines are defined differently in each "P" file. One example of a suitable language is JAVA.

In a preferred embodiment of the invention, the computer at server 16 is a powerful computer which can perform real-time services not practical at a home computer and/or requiring special software, for example speech recognition. In one preferred embodiment of the invention, input devices 20 comprises a microphone. A user provides voice commands to the microphone, which are analyzed by a powerful and/or dedicated computer at server 16. The results of the command are displayed on a TV set at the user, as described above.

It should be appreciated that by keeping expensive software at server 16, and or/at a remote location which has a high speed connection to server 16, the owner of the software can be better protected against pirating of the software. The number of copies of the software is substantially reduced. In addition, users who would not buy the software can use it and pay royalties only for what they use, so another inducement to piracy is removed.

In a preferred embodiment of the invention, a free trial and/or preview mechanism may be provided. Since the software is at the server and not at the user, such previews can be more easily accessed by a user and there is a reduced danger of piracy. In a preferred embodiment of the invention, the server is protected using well known software and/or hardware protection mechanisms to prevent the copying of certain software and/or files from the computer to remote locations. In an exemplary embodiment of a rental/preview system, the use of a software may be billed at various rates, including but not limited to one or more of (a) free time, free number of uses or free number of transactions, e.g., for a preview; (b) per use charge; (c) per hour; (d) flat rate, possibly even a nominal flat fee for previewing; (e) per data manipulated and/or tailored billing schemes, which may be matched to a particular user, group of users and/or type of software. Alternatively or additionally, other accounting methods may be used. Possibly, the fees may vary between users, based for example on their seniority and the amount that they use this or other software. Alternatively or additionally, different billing rates (e.g., preview) may be associated with different software capabilities. Alternatively or additionally, such different capabilities may be associated with users or groups of users.

In a preferred embodiment of the invention, the above system is used to encourage a user to sign on to a service after a short preview thereof. In a preferred embodiment of the invention, most of the required sign-on information is available, for example having been entered by the user when the system is installed, and what is missing is only the user's OK. Preferably, after the user uses the software or other service for a while a preview screen or button is presented to him. Preferably, only minimal action by the user is required for sign-on, for example clicking the displayed button. Alternatively or additionally, to registering for a software, a user can purchase a physical product (such as a software package) or a service, such as a weather ticker.

In a preferred embodiment of the invention, the above described configurations are used for dissemination of copyrighted material. In one aspect of this embodiment, each viewing/displaying/sounding of the material can be monitored and charged centrally by the cable operator, simplifying accounting processes. Additionally or alternatively, since the material is compressed before it is sent to the subscriber, its quality is not digital-perfect. Thus, pirated copies are of an inferior quality. Additionally or alternatively, each copy so transmitted can be marked with an individual copy number, preferably in a hidden location in the data. Thus, if the copyrighted material is copied, it is possible to trace the source of the copy.

In a preferred embodiment of the invention, overlays on a channel, especially a broadcast channel is used for prompting a user for input.

A first type of overlay is a teaser, preferably a ticker, which prompts the user to switch to a different channel. Alternatively or additionally, a control may be displayed, for example a button, for the user to select, to switch the channel. Possibly a plurality of such controls are displayed. In an exemplary embodiment, a user clicks once to change the channel and a second time to view information (e.g., video, WWW, text, audio) associated with the program or advertisement he was just watching, on the second channel (or a third one). Alternatively or additionally, the original broadcast can include a number for the user to enter or to select from the second channel, to view specific information. Alternatively or additionally, a tag may be provided on the video stream, to be read by the system and/or by the set-top box. Alternatively or additionally, such a tag may be embedded in the visual, audio, data and/or VBI sections of the channel. Other types of hyperlinking may also be practiced using such a tag, besides those methods which utilize a compressed video server as described herein, for example a WebTV system.

Alternatively or additionally to controls, a menu may be presented. In a preferred embodiment of the invention, the menu is rearranged responsive to the users selections, so that the most common selections are near the head of the menu (or menu tree). Preferably, such reorganization is performed only once, or at long intervals, so that the system behaves in a stable manner and has time to learn the preferences of each user. Alternatively to a per user personalization, a per set-top box or per user group personalization may be generated.

Alternatively or additionally, to controls, a voice channel may be used. The voice channel may be used to enter commands or for display, for example to echo the display and/or to add information to what is displayed.

It should be noted that in some preferred embodiments of the invention the personalization of the behavior of the system and of the content is per user, not only per set-top box. The user may be identified, for example, based on a logon id entered by the user.

Figure 5:
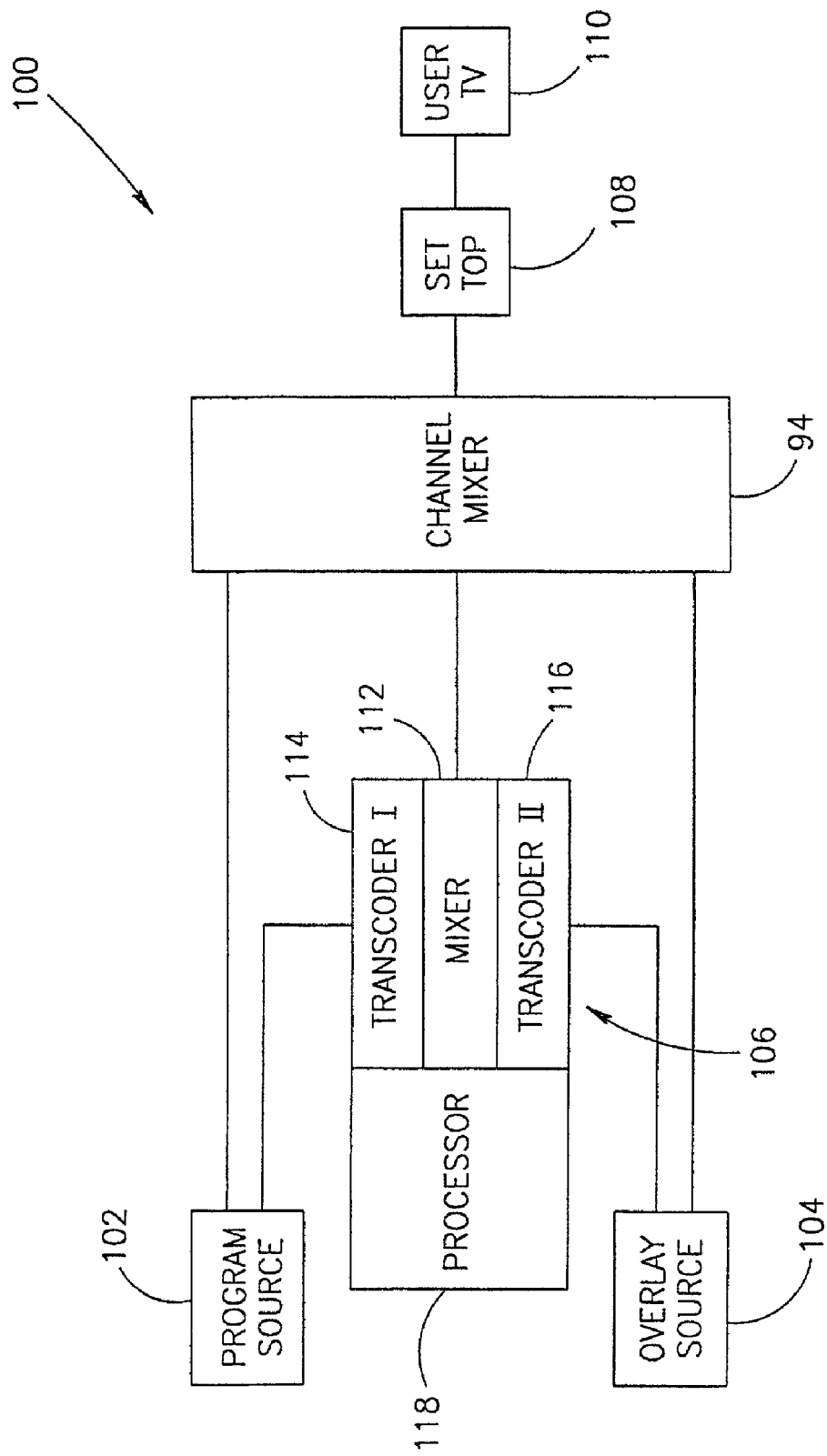
FIG. 5 is a schematic diagram of a broadcast enhancement configuration, in accordance with a preferred embodiment of the invention.

FIG. 5 is a schematic diagram of a broadcast enhancement configuration 100, in accordance with a preferred embodiment of the invention. A program from a program source 102 is enhanced by an image enhancer 106, before being transmitted to a set top box 108 which decodes the enhanced program for a user TV 110. Preferably, but not necessarily, the program source is a broadcast source, for example cable TV, broadcast (wireless) TV or a satellite feed. Alternatively or additionally, other channels, as described herein may be used as the programs source. In some preferred embodiments of the invention, the program source is provided in compressed form, such as in MPEG II format, however, as will be explained below, this is not necessary. Unlike some other preferred embodiments of the invention described above, the enhancements are preferably added to the program stream which reaches the set top box, rather than being added by the set top box. Thus, a less complicated (e.g., less memory, CPU power) set-top box can be used. In particular, the decompression module is preferably not modified. It is noted however, that in some embodiments of the invention, the enhancements, described below, may be performed at the set-top box, for example based on enhancement commands provided on the same or a separate channel. Alternatively or additionally, the enhancements are performed earlier in the data stream, for example at a node or at the cable head end.

One preferred type of enhancement is the addition of overlay information to the program stream. In one example, the added information is personalized advertising or added information responsive to a user request for more information regarding a program or advertising. One type of hyper-linking between TV and other information is described, for example in PCT publication WO 99/15968, the disclosure of which is incorporated herein by reference, however, other types of hyper-linking are also known. Alternatively or additionally, the added information is personal information, such as e-mail messages. This type of enhancement is indicated by a mixer 112 mixing the program from source 102 and a stream from an overlay source 104. Alternatively or additionally, to an overlay, the two sources may be displayed side by side (e.g., arranged horizontally, vertically or one partially or completely encompassing the other). In some embodiments more than two sources are used, for example two or more broadcast channels or two or more overlay channels. Generally, it is desirable that a user maintain interest in a TV program even while viewing other information. In a preferred embodiment of the invention, the TV channel (or the overlay channel) is shown as a window in the other channel (or vice versa). The TV channel may be reduced in size and/or clipped. Two specific types of overlays which are provided in accordance with preferred embodiments of the invention are WWW content and e-mail messages and/or notification, which may be provided as a banner.

Whichever channel is in the background may have its resolution reduced, for example, spatial, temporal, color or gray-scale resolution. Alternatively or additionally, the background channel may be compressed to a lower bit-per-pixel ratio, reducing its quality. Possibly, different parts of the image are enhanced by different amounts. Alternatively or additionally, the overlay may be made sharper or otherwise manipulated so that it stands out as an overlay relative to the background.

Alternatively or additionally, the enhancement may comprise matching the channel characteristics to a viewer, for example as described above with respect to matching a computer display to a TV screen and a particular user's physiological limitations. This type of enhancement is indicated by a processor 118 in FIG. 5. In a preferred embodiment of the invention, a user is presented with a menu of different types of image enhancements to choose between. Possibly, a user selects a default enhancement to be applied, for when a particular button on a remote control is activated. Possibly, a user is charged for the enhancements, for example on a fixed cost basis, or possibly based on actual costs and/or usage of critical resources, such as processing power, memory and/or bandwidth.

In a preferred embodiment of the invention, even if the TV image is differently enhanced for different users, the audio channel remains the same and is broadcast to all the users, regardless of their personal enhancements to the channel. Thus, a significant saving of channel bandwidth may be achievable. One possible result of maintaining the audio feed as in the original program, is that a viewer maintains situational awareness of the TV channel, even though the image may be degraded or missing. For example, a viewer can thus determine when a commercial is over.

In a preferred embodiment of the invention, the enhancements of the program stream are achieved with a minimum amount of processing. In one example, a TV program stream is provided compressed so that it can be transcoded, using a transcoder 114 before being mixed with an overlay stream. Alternatively or additionally, the overlay stream is either provided compressed and transcoded using a transcoder 116, or, as described above, is easily compressed, for example being generated under the control of a computer. Thus, in some cases, the enhancement comprises mixing two MPEG II streams, with blocks from one stream either displacing blocks from the other or being combined with them.

In the example of picture size clipping, this can be achieved on an MPEG stream without decompressing it, for example by dropping blocks, as can the various resolution reduction schemes, for example as described above and/or in one or more of the following patents and paper, U.S. Pat. No. 5,408,274, U.S. Pat. No. 5,453,780, U.S. Pat. No. 5,708,732 and in an article, "A Frequency-Domain Video Transcoder for Dynamic Bit-Rate Reduction of MPEG-2 Bit Streams," by Mohammed Ghanbari and Pedro Assuncao, which appeared in *IEEE Transactions on Circuits and Systems for Video technology*, December 1998, the disclosures of which are incorporated herein by reference. In particular, statistical multiplexing can be used to reduce image quality gradually. Preferably, the statistical multiplexing is applied to affect background image blocks more than foreground image blocks. Such statistical multiplexing may be required if there are many different customizations. Enhancements for a single channel and/or system bandwidth is limited. Other examples of enhancement include enhancing audio, adding a stereo (vision) channel to a non-stereo channel, enhancing a stream based on stored information, such as frames or parse of frames of the stream and/or swapping advertisements of the stream with stored, retrieved and/or broadcast advertisements.

In an alternative example, TV broadcasts are captured using a TV card at the head-end and then transcoded or encoded into MPEG II (or any other compression method used by the system). To reduce system overhead, an inefficient transcoding or encoding algorithm may be used, so that such channels may be compressed to a lower quality than if they were provided in a compressed form. Alternatively or additionally, the channel quality is reduced to save bandwidth.

In some cases, only part of the TV channel has an overlay. Thus, those unaffected blocks may be broadcast while the rest of the blocks are transmitted separately for each user (or, possibly, some of the enhanced blocks may also be shared between users). An example of a overlay is a ticker, for example a teaser for the user to switch to a different channel to view more information or enhance the showing. In one example, a user may view a sports show and by selected an enhanced channel he can simultaneously view both a wide view and a close-up, as well as relevant WWW information. Preferably a specific button is designated on the user's remote control for switching to the system channel.

In a particular implementation, enhancement information is transmitted with the video channel to be selectively used by the set top box. In the teaser example, a plurality of different displays can be resent each frame or several frames. The set-top box decides which one of the displays is overlaid on the video. Thus, the user interface serves to select which ones of the displays are shown. The data may be sent to the set-top box in several ways, alternatively or additionally to the original video stream being modified at the head-end, including by sending display commands (such as "display text 'press me'") to the set-top box, by ending replacement compressed display image blocks and/by sending an overlay. In some of these methods there is no need to compressed the data. In others, the data is compressed. Preferably, a light (relative to MPEG) compression is used, for example vector quantization or chain code. In an exemplary embodiment of vector quantization, the overlay is compressed using 2×2 or 4×4 microblocks, which are indexed by a table. Possibly, a single table is shared between all users. Alternatively or additionally, a different table is used per group of users, for example, per cable system node. If a particular micro-block does not change between frames, in some embodiments no indication is required, and no bandwidth is required either. The transport method is preferably the data channel portion of the MPEG stream or in the VBI (vertical blanking interval). Alternatively or additionally, other methods of transmission may be used, for example the telephone or a satellite feed.

In a preferred embodiment of the invention, advantage is taken of the fact that a single computer configuration controls the enhancement of several users. In one exemplary embodiment, hyper-linking to advertisements is synchronized between viewers, so that all (or at least more than one) of the viewers interested in a particular advertisement will be switched to a same "personalized" display, preferably, but not necessarily, at a same time. Preferably, but not necessarily, these personalized information displays are synchronized, as described above, to reduce bandwidth requirements.

In another example of utilizing the central control, a TV channel may be transcoded and/or reduced in quality once, for several different enhancements. Then, several different personalized streams can all utilize a same degraded (or enhanced) TV program source, possibly reducing processing and/or storage requirements.

As described above, the video content of a channel is altered, while an audio portion is not. However, in some preferred embodiments of the invention, the audio content is altered, instead of or in addition to the video content. One example is in pure audio channels. However, modifying the audio content is also useful in some cases, including:

(a) Replacing an audio portion (left, right or even both) with a dubbed stream, in another language. Preferably, a user can select which of several audio channels s/he wishes to hear.

(b) Enhancing an audio stream by adding stereo effects or other sound effects.

(c) Enhancing an audio stream by amplifying certain frequencies, for example for persons with auditory challenges.

(d) Generating and transmitting closed captions or artificial ASL (American sign language) gestures in real-time (for example by automatic voice recognition of the channel audio, which can also be used for automatic translation into another language, preferably the recognition program being provided with some details on the source channel, such as the language, possibly even sex or even identity of the actors, to aid in the recognition). Possibly, the channel is delayed by a short amount, to allow the captions to catch up with the image.

(e) Censoring obscene language, for example using a general or a personalized list of unacceptable language. Possibly the level of censor may depend on an identification of the viewer and/or may require a password to circumvent. In some preferred embodiments of the invention, obscene channels are detected based on the audio cannel, for example by processing at the head end.

(f) Personalizing only the audio of an advertisement, for example to supply a different call back number.

Alternatively or additionally, the audio channels may be modified and/or replaced in order to provide the user with feedback for the overlay channel. Such feedback may include voice feedback or may be only primitive beeps or clicks. The feedback may be generated, for example, at the set-top box, or, more preferably, by processor 118 or overlay source 104. Possibly, this feedback is provided only on one of a pair of stereo channels, so that a user can better discriminate between the feedback and the original TV channel audio. Possibly, an audio stream containing only feedback signals can be compressed a great deal without compromising its function. The original channels may be combined, or, possibly one of the original channels superseded. Alternatively or additionally, the auditory feedback is inserted as individual packets of audio into a stream of otherwise broadcast audio, for example using mechanism described above for video packet broadcasting. In an alternative embodiment, the feedback, especially clicks, are broadcast to all users and each user set top box mutes all the clicks except for those which relate to himself.

It should be appreciated that some of the embodiments described herein may also be performed using other types of client/server communications, besides compressed video, for example using data communications to a set-top box which renders displays based on the data.

In a preferred embodiment of the invention, the browser executed at server 16 interacts with the compression process. In one example, server 16 may indicate to the browser a desired compression and/or quality level. Such an indication may cause the browser the perform display modifications, when laying out the display elements. Alternatively or additionally, it may affect the type of graphical primitives generated by the browser. Alternatively or additionally, a configuration file, preferably read at start-up may define desired modifications in the browser output. Alternatively or additionally, the browser generates a special data output stream to server 16, in which the browser indicates display commands which may be superfluous or which require a large computational expenditure for compression and/or which increase compression bandwidth. Alternatively or additionally, the WWW page may include a plurality of display options for at least some of the objects to be displayed. Thus, if a resolution reduction is required, the reduction may be pre-planned in the WWW page definition, rather than imposed after the fact by the browser and/or server 16.

In a preferred embodiment of the invention, a WWW page designing program preferably also includes an ability to take into account limitations imposed by the compression and/or available bandwidth. In a preferred embodiment of the invention, an automatic WWW page generator, for example, one associated with a WWW server, receives an indication of compression and/or bandwidth limitations and therefore generates a WWW page which meets these limitations.

The above description has focused on providing compressed multimedia streams using cable TV networks. However, in some cases, the present invention may be advantageously practiced using a different transport medium. In one example, the multimedia streams are transmitted via satellite channels. Alternatively or additionally, telephone lines are used, for example, regular telephone (POTS), ISDN, DSL and/or ADSL. Possibly, the service provider will provide the set top box. Alternatively or additionally, an existing set-top box may be used. Possibly, digital TVs and/or video recorders having a built in MPEG II decompressor may be used instead of a set-top box.

Alternatively or additionally, a computer network is used, for example a LAN or a WAN. Alternatively or additionally, the data is provided as a compressed multimedia stream over the Internet. Possibly, a decoding personal computer is provided, which connects to the Internet and possibly generate an output stream for a TV set, preferably using a video card.

Alternatively or additionally, compressed images and other multimedia streams are transmitted to a cellular phone, for example a telephone having a JPEG or an MPEG II decompressor.

It will be appreciated that the above described methods of client-server communication and video compression may be varied in many ways, including, changing the order of steps, which steps are performed on-line or off-line, such as table preparation, and the exact implementation used, which can include various hardware and software combinations. Also, although a head-end configuration has been emphasized, the processing and/or channel manipulations described herein may also be performed at other points in the cable distribution system. Possibly, the processing is performed outside of the system, for example, by an Internet site providing a plurality of similar, customized channels for use by the system, instead of the system doing the customizing itself. In addition, a multiplicity of various features has been described. It should be appreciated that different features may be combined in different ways. In particular, not all the features are necessary in every preferred embodiment of the invention. For example, only some of the efficiency enhancing steps may be used in a particular compression system. Software as described herein is preferably provided on a computer readable media, such as a diskette or an optical disk. Alternatively or additionally, it may be stored on a computer, for example in a main memory or on a hard disk, both of which are also computer readable media. When used in the following claims, the terms "comprises", "includes", "have" and their conjugates mean "including but not limited to".

It will be appreciated by a person skilled in the art that the present invention is not limited by what has thus far been described. Rather, the scope of the present invention is limited only by the following claims.

The invention claimed is:

1. A method of personalizing a broadcast stream, comprising:

providing a broadcast video stream;

personalizing the stream at a central distribution station and in a manner that reduces a visual quality of said provided video stream, wherein reducing the visual quality of the video stream includes using different compression parameters for different GUI display elements of a frame within the video stream, and such that standard GUI display elements of the frame, comprising one or more border and one or more menu, are compressed to a lower quality than unknown GUI display elements of the frame, comprising GUI display elements other than the one or more border and one or more menu, and such that the standard GUI display elements and the unknown GUI display elements are identified by a process that does not require human interaction while adding personalized information, and wherein reducing the visual quality of the video stream further includes selecting modifiable parameters for performing compression on the broadcast stream, and wherein selection of the modifiable parameters is based at least in part on a prediction of future frames of the broadcast stream; and transmitting the personalized broadcast stream to the user system using a compressed video transport.

2. A method as recited in claim 1, wherein the standard display elements comprise one or more of icons and menu bars.

3. A method according to claim 1, wherein personalizing said stream comprises:
providing a list of display commands;
generating a compressed video stream from said commands; and
combining said compressed video stream and said broadcast stream.

4. A method according to claim 3, wherein said generating comprises directly generating transform coefficients from said command.

5. A method as recited in claim 1, wherein personalizing the stream includes duplicating a program that generates the broadcast video stream and transmitting the personalized video stream over a different channel than is used to transmit the broadcast video stream.

6. A method as recited in claim 1, wherein personalizing the video stream includes generating a plurality of different P frames which refer to a same I frame and a same spatial portion of a display, the plurality of different P frames corresponding to different particular users, wherein the method further includes utilizing only some of the P frames, which are relevant for each particular user.

7. A method as recited in claim 1, wherein personalizing the video stream includes replacing at least one compressed block of the video stream with different compressed data and without first decompressing the video stream.

8. A method as recited in claim 1, further comprising:
personalizing the stream by generating overlay data at the central distribution station; and
overlaying said overlay data at a set-top box of said user, wherein at least some of said overlay data is not a block-replacement overlay.

9. A method according to claim 8, wherein said overlay data comprises opaque data that visually replaces underlying information.

10. A method according to claim 8, wherein said overlay data comprises transparent data that visually combines underlying information.

11. A method according to claim 8, wherein said transmitting comprises transmitting in a broadcast system, whereby the personalized transmitted stream reaches a plurality of subscribers.

12. A method according to claim 11, wherein only a designated user can view said personalized stream.

13. A method according to claim 8, wherein said personalization makes said stream interactive.

14. A method according to claim 8, comprising receiving a user input at said central distribution station.

15. A method according to claim 14, wherein said input comprises a response to content of a personalized stream.

16. A method according to claim 14, comprising determining an identification of a user for which to perform said personalization, from said user input.

17. A method according to claim 16, wherein said user input comprises a user login ID.

18. A method according to claim 8, wherein said video stream is provided as a compressed video stream.

19. A method according to claim 8, wherein said stream is transmitted using a single channel of said transport.

20. A method according to claim 8, wherein said personalizing comprises modifying a visual portion of said stream.

21. A method according to claim 8, wherein said personalization comprises adding an output from a computer program.

22. A method according to claim 21, wherein said computer program comprises an e-mail program.

23. A method according to claim 21, wherein said computer program comprises an Internet browser.

24. A method according to claim 8, wherein said personalization comprises adding information from an Internet source.

25. A method according to claim 8, wherein said stream is compressed using an MPEG compliant compression scheme.

26. A method according to claim 25, wherein said MPEG comprises MPEG II.

27. A method according to claim 8, wherein said compressed video transport comprises an MPEG compliant transport.

28. A method according to claim 27, wherein said MPEG comprises MPEG II.

29. A method according to claim 8, wherein said central distribution station comprises a cable network head-end.

30. A method according to claim 8, wherein said compressed video transport comprises a cable network transport.

31. A method according to claim 1, wherein said quality is reduced to maintain a bandwidth requirement of said stream in said transport.

32. A method according to claim 1, wherein said stream is compressed using an MPEG compliant compression scheme.

33. A method according to claim 32, wherein said MPEG comprises MPEG II.

34. A method according to claim 1, wherein said compressed video transport comprises an MPEG compliant transport.

35. A method according to claim 34, wherein said MPEG comprises MPEG II.

36. A method according to claim 1, wherein said central distribution station comprises a cable network head-end.

37. A method according to claim 1, wherein said compressed video transport comprises a cable network transport.

38. A method as recited in claim 1, wherein the modifiable parameters arc further selected at least in part based on identified capabilities of a user system.

39. A method as recited in claim 1, wherein prior to compression at least one of the GUI display elements is modified in the broadcast stream to make compression faster.

40. A method as recited in claim 1, wherein the compression is performed in such a way as to reduce scrolling resolution of a display provided with the broadcast stream.

41. A method as recited in claim 1, further comprising an act of moving at least one item straddling a block boundary in a display frame so that the item no longer straddles the block boundary.

42. A method as recited in claim 1, wherein the prediction of future frames includes distinguishing between JPEG and MPEG data as part of the prediction to determine the selection of the modifiable parameters.

* * * * *